(12) United States Patent
Singh et al.

(10) Patent No.: US 11,405,839 B2
(45) Date of Patent: Aug. 2, 2022

(54) MOBILE-TERMINATED CALL HANDLING DURING LATENCY-SENSITIVE SERVICES

(71) Applicant: QUALCOMM Incorporated, San Diego, CA (US)

(72) Inventors: Vikram Singh, San Diego, CA (US); Mutaz Zuhier Afif Shukair, San Diego, CA (US); Reza Shahidi, San Diego, CA (US); Yong Xie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 17/036,115

(22) Filed: Sep. 29, 2020

(65) Prior Publication Data

US 2022/0104091 A1 Mar. 31, 2022

(51) Int. Cl.
| | |
|---|---|
| *H04W 4/00* | (2018.01) |
| *H04W 36/22* | (2009.01) |
| *H04W 36/00* | (2009.01) |
| *H04W 36/14* | (2009.01) |
| *H04W 48/06* | (2009.01) |
| *H04W 84/04* | (2009.01) |
| *H04W 84/12* | (2009.01) |

(52) U.S. Cl.
CPC ....... *H04W 36/22* (2013.01); *H04W 36/0005* (2013.01); *H04W 36/14* (2013.01); *H04W 48/06* (2013.01); *H04W 84/042* (2013.01); *H04W 84/12* (2013.01)

(58) Field of Classification Search
CPC combination set(s) only.
See application file for complete search history.

(56) References Cited

U.S. PATENT DOCUMENTS

| | | | |
|---|---|---|---|
| 2010/0208624 A1 | 8/2010 | Vikberg et al. | |
| 2013/0142088 A1 | 6/2013 | Li et al. | |
| 2016/0135231 A1* | 5/2016 | Lee | H04W 48/18 370/329 |
| 2016/0174191 A1 | 6/2016 | Singh et al. | |
| 2020/0100153 A1* | 3/2020 | Huang | H04W 36/0022 |
| 2021/0282059 A1* | 9/2021 | Li | H04M 7/0057 |

FOREIGN PATENT DOCUMENTS

JP 2010154079 A 7/2010

OTHER PUBLICATIONS

International Search Report and Written Opinion—PCT/US2021/049367—ISA/EPO—dated Dec. 10, 2021; 17 pages.

* cited by examiner

*Primary Examiner* — Justin Y Lee
(74) *Attorney, Agent, or Firm* — The Marbury Law Group, PLLC

(57) ABSTRACT

Various embodiments include methods and user equipment (UE) for mobile-terminated call handling when a latency-sensitive service (LSS) is active on the UE. Embodiments may include determining a radio access technology (RAT) used for a latency-sensitive service (LSS) currently active on the UE in response to receiving an MT call invitation and determining whether a latency-prone service command is received that includes service commands configured to change the determined RAT used for the LSS to another RAT likely to compromise the LSS. In response to determining that a latency-prone service command is received the MT call invitation may be rejected, but in response to determining that a latency-prone service command is not received, MT call alerting may be allowed.

27 Claims, 14 Drawing Sheets

MOBILE-TERMINATED CALL HANDLING DURING LATENCY-SENSITIVE SERVICES

BACKGROUND

Long Term Evolution (LTE), Fifth Generation (5G) new radio (NR)(5G-NR), and other recently developed communication technologies allow mobile devices to communicate information at data rates (e.g., in terms of Gigabits per second, etc.) that are orders of magnitude greater than what was available just a few years ago. Today's communication networks are also more secure, allow for lower network traffic latencies, and provide better communication efficiencies (e.g., in terms of bits per second per unit of bandwidth used, etc.). These and other recent improvements have facilitated the availability of some high-speed mobile device services that would otherwise be too sensitive to latencies to work well.

When a latency-sensitive service (LSS) is active on a single-subscriber identity module (SSIM) or multi-subscriber identity module (MSIM) mobile devices, with only one radio frequency (RF) resource, mobile terminated (MT) calls may still be received, but the MT call will tend to compromise the LSS. Thus, many of these mobile devices provide static user settings that once set will either auto-alert (i.e., let the user decide whether to answer the MT call) regardless of whether the LSS is compromised in the process or auto-reject (i.e., reject all MT calls) in order to ensure the LSS is not compromised. In some cases, although the mobile device is using a radio access technology (RAT) that supports MT call alerting without compromising the LSS, the static user settings automatically reject any incoming calls without making the user aware a call is coming in. Similarly, sometimes LSS sessions get unnecessarily interrupted when an MT call alert is generated due to the static user settings.

SUMMARY

Various aspects include systems and methods executed by a processor of a user equipment (UE) for handling mobile terminated (MT) calls. Various aspects may include determining a radio access technology (RAT) used for a latency-sensitive service (LSS) currently active on the UE in response to receiving an MT call invitation, determining whether a latency-prone service command is received, in which latency-prone service commands include service commands configured to change the determined RAT used for the LSS to another RAT likely to compromise the LSS, rejecting the MT call invitation in response to determining that a latency-prone service command is received, and allowing MT call alerting in response to determining that a latency-prone service command is not received.

Some aspects may include receiving an LSS indication that the UE is using the LSS, in which determining the RAT used for the LSS currently active is performed further in response to receiving the LSS indication. Receiving the LSS indication may include receiving the LSS indication via a user input on a user interface option configured to enable a user to select either allowing or rejecting MT call alerts during the LSS.

Some aspects may include determining whether a camped-on cell of the determined RAT is identified on an auto-reject list for MT call alerting, and rejecting the MT call invitation in response to determining that the camped-on cell of the determined RAT is identified on the auto-reject list for MT call alerting. Some aspects may include determining whether a camped-on cell of the determined RAT is identified on an auto-reject list for MT call alerting, in which determining whether the latency-prone service command is received is performed in response to determining that the camped-on cell of the determined RAT is not identified on the auto-reject list for MT call alerting.

Some aspects may include allowing MT call alerting in response to determining that the RAT used for the LSS is not likely to compromise the LSS while allowing MT call alerting. Some aspects may include allowing MT call alerting in response to determining that the RAT used for the LSS is WiFi. Some aspects may include allowing MT call alerting in response to receiving a change-to-WiFi service command configured to change the determined RAT used for the LSS to WiFi. Some aspects may include ignoring the latency-prone service command in response to determining that the latency-prone service command is received. In some aspects, the latency-prone service command may be an evolved packed system fall back (EPS FB) command associated with a 5G new radio (NR) RAT used for the LSS. In some aspects, the latency-prone service command may be a single radio voice call continuity (SRVCC) command associated with a long-term evolution (LTE) RAT used for the LSS.

Further aspects include a UE including a processor configured with processor-executable instructions to perform operations of any of the methods summarized above. Further aspects include a non-transitory processor-readable storage medium having stored thereon processor-executable software instructions configured to cause a processor to perform operations of any of the methods summarized above. Further aspects include a processing device for use in a computing device and configured to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
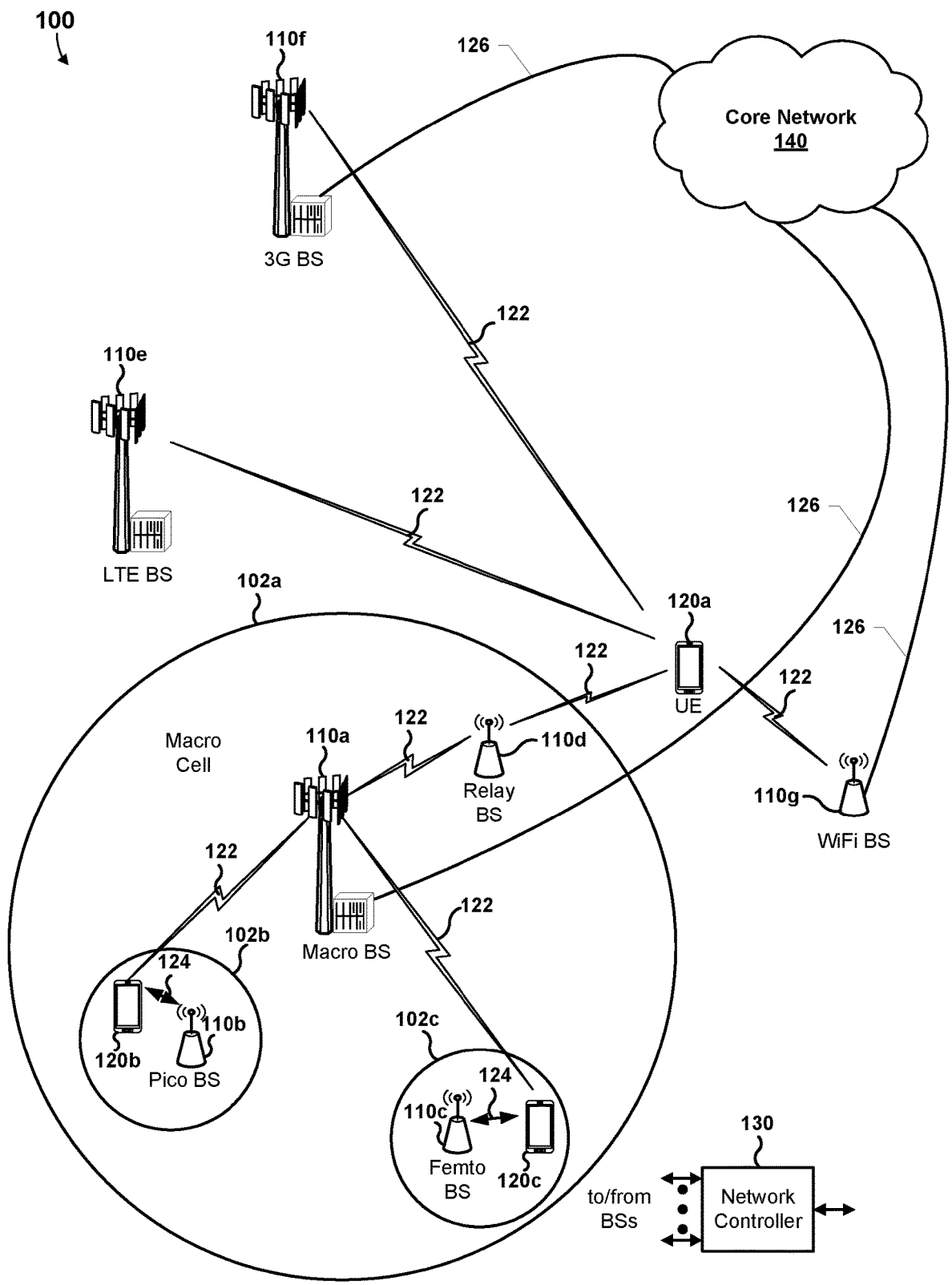
FIG. 1 is schematic diagram illustrating a UE working in conjunction with multiple RATs for handling MT calls in accordance with various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include systems and methods by a processor of a user equipment (UE) for handling MT calls an LSS application is in use. In various embodiments, a processor of the UE may determine a RAT used for an LSS currently active on the UE in response to receiving an MT call invitation. The processor of the UE may then determine whether a latency-prone service command is received. A latency-prone service command is one configured to change the determined RAT used for the LSS to another RAT likely to compromise the LSS. MT call alerting may be allowed by the processor of the UE in response to determining that a latency-prone service command is not received and the MT call invitation may be rejected by the processor of the UE in response to determining that a latency-prone service command is received. In addition, the latency-prone service command may be ignored by the processor of the UE in response to determining that the latency-prone service command is received.

In some embodiments the processor of the UE may receive an LSS indication that the UE is using an LSS, in which case the processor of the UE may determine the RAT used for the LSS currently active in response to receiving the LSS indication. Receiving the LSS indication may include receiving the LSS indication via a user input on a user interface option configured to enable a user to select either allowing or rejecting MT call alerts during the LSS.

In some embodiments the processor of the UE may make one or more determinations regarding the camped-on cell. For example, the processor may determine whether a camped-on cell of the determined RAT is identified on an auto-reject list for MT call alerting. If the camped-on cell of the determined RAT is identified on the auto-reject list for MT call alerting, the processor may reject the MT call. Also, determining whether the latency-prone service command is received may be performed by the processor of the UE in response to determining that the camped-on cell of the determined RAT is not identified on the auto-reject list for MT call alerting.

In some embodiments the processor of the UE may allow MT call alerting under various conditions. In some embodiments, the processor may enable MT call alerting in response to determining that the RAT used for the LSS is not likely to compromise the LSS while allowing MT call alerting. In some embodiments, the processor may enable MT call alerting in response to determining that the RAT used for the LSS is WiFi. In some embodiments, the processor may enable MT call alerting in response to receiving a change-to-WiFi service command configured to change the determined RAT used for the LSS to WiFi.

In some embodiments, the latency prone service command may be an EPS FB command associated with a 5G-NR RAT used for the LSS. In some embodiments, the latency prone service command may be an SRVCC command associated with an LTE RAT used for the LSS.

The terms "user equipment" and "UE" is used herein to refer to any one or all of cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, wireless router devices, wireless appliances, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, mobile devices affixed to or incorporated into various mobile platforms, global positioning system devices, and similar electronic devices that include a memory, multiple SIMs, wireless communication components and a programmable processor.

The terms "radio access technology" and "RAT" are used herein interchangeably to refer to the underlying physical and/or wireless connection methods for a radio-based communication network. Mobile devices may support several RATs in one device, such as 5G-NR, LTE, universal mobile telecommunication systems (UMTS) or 3G, global system for mobile communications (GSM) or 2G, WiFi, Bluetooth, etc. Thus, UEs may select between available RATs used to connect to a network wirelessly. In general, any number of communication systems and any number of wireless networks may be deployed in a given geographic area. Each communications system and wireless network may support a particular RAT and may operate on one or more frequencies. A RAT also may be referred to as a Radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G NSA network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an EPC network) in a 5G NSA network.

The terms "latency-sensitive service" and "LSS" are used herein interchangeably to refer to a mobile communication service that is sensitive to latency or "lag." For example, some mobile communication services, like online gaming, require fast response times to new events because slow response times may carry penalties. Similarly, online trading in financial markets require extremely low latencies for connecting to stock exchanges and executing trades in a timely manner.

As used herein, the terms "SIM" and "subscriber identity module" may interchangeably refer to a memory that may be an integrated circuit or embedded into a removable card, and that stores an International Mobile Subscriber Identity (IMSI), related key, and/or other information used to identify and/or authenticate a UE on a network and enable a communication service with the network. SIMs may support 5G-NR, or include the Universal Subscriber Identity Module (USIM) provided for in the Long Term Evolution (LTE) 3GPP standard, and the Removable User Identity Module (R-UIM) provided for in the 3GPP2 standard. Universal Integrated Circuit Card (UICC) is another term for SIM. Moreover, a SIM may also refer to a virtual SIM (VSIM), which may be implemented as a remote SIM profile loaded in an application on a UE, and enabling normal SIM functions on the UE.

Because the information stored in a SIM enables the UE to establish a communication link for a particular communication service or services with a particular network, the term "SIM" is also used herein as a shorthand reference to the communication service associated with and enabled by the information stored in a particular SIM as the SIM and the communication network, as well as the services and subscriptions supported by that network, correlate to one another. Similarly, the term SIM may also be used as a shorthand reference to the protocol stack and/or modem stack and communication processes used in establishing and conducting communication services with subscriptions and networks enabled by the information stored in a particular SIM.

The term "system-on-chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single UE. The proximity of the SOCs facilitates high speed communications and the sharing of memory and resources.

As used herein, the terms "network," "wireless network," "cellular network," and "wireless communication network" may interchangeably refer to a portion or all of a wireless network of a carrier associated with a UE and/or subscription on a UE. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), IEEE 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards.

As used herein, the term "RF resource" refers to the components in a communication device that send, receive, and decode radio frequency signals. An RF resource typically includes a number of components coupled together that transmit RF signals that are referred to as a "transmit chain," and a number of components coupled together that receive and process RF signals that are referred to as a "receive chain."

Modern UEs may now include a plurality of SIMs that enable a user to connect to different wireless communication networks with the same UE. The plurality of SIMs may enable the UE to communicate with the same base station of a wireless network using two different subscriptions. As an example, the UE may communicate with a base station of a 5G NSA network using information stored in a first 5GNR SIM associated with a first 5GNR subscription and that same base station of the 5G NSA network using information stored in a second 5GNR SIM associated with a second 5GNR subscription. Each SIM stores information that serves to identify and authenticate a subscriber using a particular UE, and each SIM is associated with only one subscription. For example, a SIM may be associated with a subscription to one of a GSM, TD-SCDMA, CDMA2000, and/or WCDMA system. Further, multi-SIM operations may be applicable to any of a number of wireless communication systems, using various multiple access schemes, such as, but not limited to, CDMA, FDMA, OFDMA, or TDMA. Each SIM in a UE is configured with its own mobile subscription identification number (MSIN) (also called the mobile identification number (MIN), and/or mobile station identification (MSID)), which is the 10-digit unique number that the wireless carrier uses to identify the UE. In some implementations, two or more 5GNR SIMs and their respective 5GNR subscriptions on a multi-SIM UE may each be associated with a same network operator. As one example, in a multi-SIM UE a first 5GNR SIM associated with a first 5GNR subscription and a second 5GNR SIM associated with a second 5GNR subscription may both be associated with the same network operator to support provisioning different services to the multi-SIM UE for each 5GNR subscription. As used herein, the term "network operator" refers to a provider of wireless communications services that owns or controls elements to sell and deliver communication services to an end user, and provides necessary provisioning and credentials as policies implemented in UE subscriptions.

LTE is a mobile network standard for 4G wireless communication of high-speed data developed by the 3GPP (3rd Generation Partnership Project) and specified in its Release 8 document series. In contrast to the circuit-switched (CS) model of cellular network standards, LTE has been designed to support only packet switched (PS) services. Data services in LTE may be provided over the Internet, while multimedia services may be supported by the Internet Multimedia Subsystem (IMS) framework. The LTE standard is based on the evolution of the Universal Mobile Telecommunications System (UMTS) radio access through the Evolved Universal Terrestrial Radio Access Network (E-UTRAN). The E-UTRAN together with the Evolved Packet Core (EPC) network (core network accommodating LTE) make up an Evolved Packet System (EPS). While the access network in UMTS emulates a circuit-switched connection for real time services and a packet-switched connection for datacom services, the Evolved Packet System (EPS) is purely Internet Protocol (IP) based, and both real time services and datacom services are carried by the IP protocol.

The 5G system is an advanced technology from 4G LTE, and provides a new radio access technology (RAT) through the evolution of the existing mobile communication network structure. A 5G system may support, for example, extended LTE (eLTE) as well as non-3GPP access (e.g., WLAN).

One implementation option for 5G systems or networks currently being adopted is a 5G NSA network in which a radio access network (RAN) providing both LTE (also referred to as 4G) and NR (also referred to as 5G) support (e.g., a RAN including both LTE base stations, such as LTE Evolved nodeBs (eNodeBs or eNBs), and NR base stations, such as Next Generation NodeB (gNodeBs or gNBs)) is connected to an LTE core network (e.g., an Evolved Packet Core (EPC) network). A UE in such 5G NSA networks that can support both LTE and NR communications can signal to the 5G NSA that the UE supports dual connectivity with new radio (DCNR). In some implementations the signaling to the 5G NSA network may be on a per-subscription basis. As one example, in a multi-SIM UE a first 5GNR SIM associated with a first 5GNR subscription and a second 5GNR SIM associated with a second 5GNR subscription may both be associated with the same network operator to support provisioning different services to the multi-SIM UE for each 5GNR subscription may both signal to the 5G NSA that each respective 5GNR subscription supports DCNR.

FIG. 1 is a system block diagram illustrating an example communication system 100 suitable for implementing any of the various embodiments. The communications system 100 may include a 5G-NR network, an LTE network, a UMTS network (i.e., 3G), a WiFi network, or any other suitable network.

The communications system 100 may include a heterogeneous network architecture that includes a core network 140 and one or more UEs (illustrated as UEs 120a, 120b, 120c), which may represent any one of a variety of UEs. The communications system 100 may also include a number of base stations (illustrated as Macro BS 110a, Pico BS 110b, Femto BS 110c, Relay BS 110d, LTE BS 110e, 3G BS 110f, and WiFi BS 110g) and other network entities. A base station is an entity that communicates with UEs, and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" may refer to a coverage area of a base station, a base station subsystem serving this coverage area, or a combination thereof, depending on the context in which the term is used. The core network 140 may be any type core network, such as an LTE core network (e.g., an EPC network), 5G core network, etc.

The base stations 110a-110g may provide communication coverage for a macro cell, a pico cell, a femto cell, a WiFi cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A base station for a macro cell may be referred to as a macro BS. A base station for a pico cell may be referred to as a Pico BS. A base station for a femto cell may be referred to as a Femto BS. A base station for a WiFi cell may be referred to as a WiFi BS or a home BS. In the example illustrated in FIG. 1, a base station 110a may be a macro BS for a macro cell 102a, a base station 110b may be a Pico BS for a Pico cell 102b, and a base station 110c may be a Femto BS for a Femto cell 102c. A base station 110a-110g may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110g may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110g may communicate with the core network 140 over a wireless communication link 122 and/or a wired communication link 126. The UEs 120a-120c may communicate with the base stations 110a-110g over wireless communication links 122.

The wired communication links 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., Relay BS 110d). A relay station is an entity that can receive a transmission of data from an upstream station (for example, a base station or a UE) and transmit the data to a downstream station (for example, a UE or a base station). A relay station also may be a UE that can relay transmissions for other UEs. In the example illustrated in FIG. 1, the Relay BS 110d may communicate with the Macro BS 110a and the UE 120a in order to facilitate communication between the Macro BS 110a and the UE 120a. A relay station also may be referred to as a relay base station and/or a relay.

The communications system 100 may be a heterogeneous network that includes base stations of different types, for example, macro base stations, pico base stations, femto base stations, relay base stations, LTE base stations, 3G base stations, WiFi base stations, etc. These different types of base stations may have different transmit power levels, different coverage areas, and different impacts on interference in communications system 100. For example, macro base stations, LTE base stations, and/or 3G base stations, may have a high transmit power level (for example, 5 to 40 Watts), WiFi base stations may have medium-range transmit power levels (e.g., 2-20 Watts), and pico base stations, femto base stations, and relay base stations may have lower transmit power levels (e.g., 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The UEs 120a, 120b, 120c may be dispersed throughout communications system 100, and each UE may be stationary or mobile. A UE also may be referred to as an access terminal, a terminal, a mobile station, a subscriber unit, a station, user equipment (UE), etc.

A macro base station 110a may communicate with the communication network 140 over a wired or wireless communication link 126. The UE 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more Radio access technologies (RATs). Examples of RATs that may be used in a wireless communication link include 3GPP LTE, 3G, 4G, 5G (e.g., NR), GSM, CDMA, WCDMA, Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

In accordance with various embodiments, the UEs 120a, 120b, 120c may handle LSS on some, but not all the RATs. For example, the UEs 120a, 120b, 120c may handle LSS when communications come through the Macro BS 110a, Pico BS 110b, Femto BS 110c, Relay BS 110d, LTE BS 110e, and WiFi BS 110g, but not the 3G BS 110f. However, even when communications come through the Macro BS 110a, Pico BS 110b, Femto BS 110c, Relay BS 110d, or LTE BS 110e, if the UEs 120a, 120b, 120c are handling LSS and an MT call comes in, receipt of a latency-prone service command (e.g., EPS FB for NR or SRVCC for LTE) may disrupt the LSS.

Figure 2:
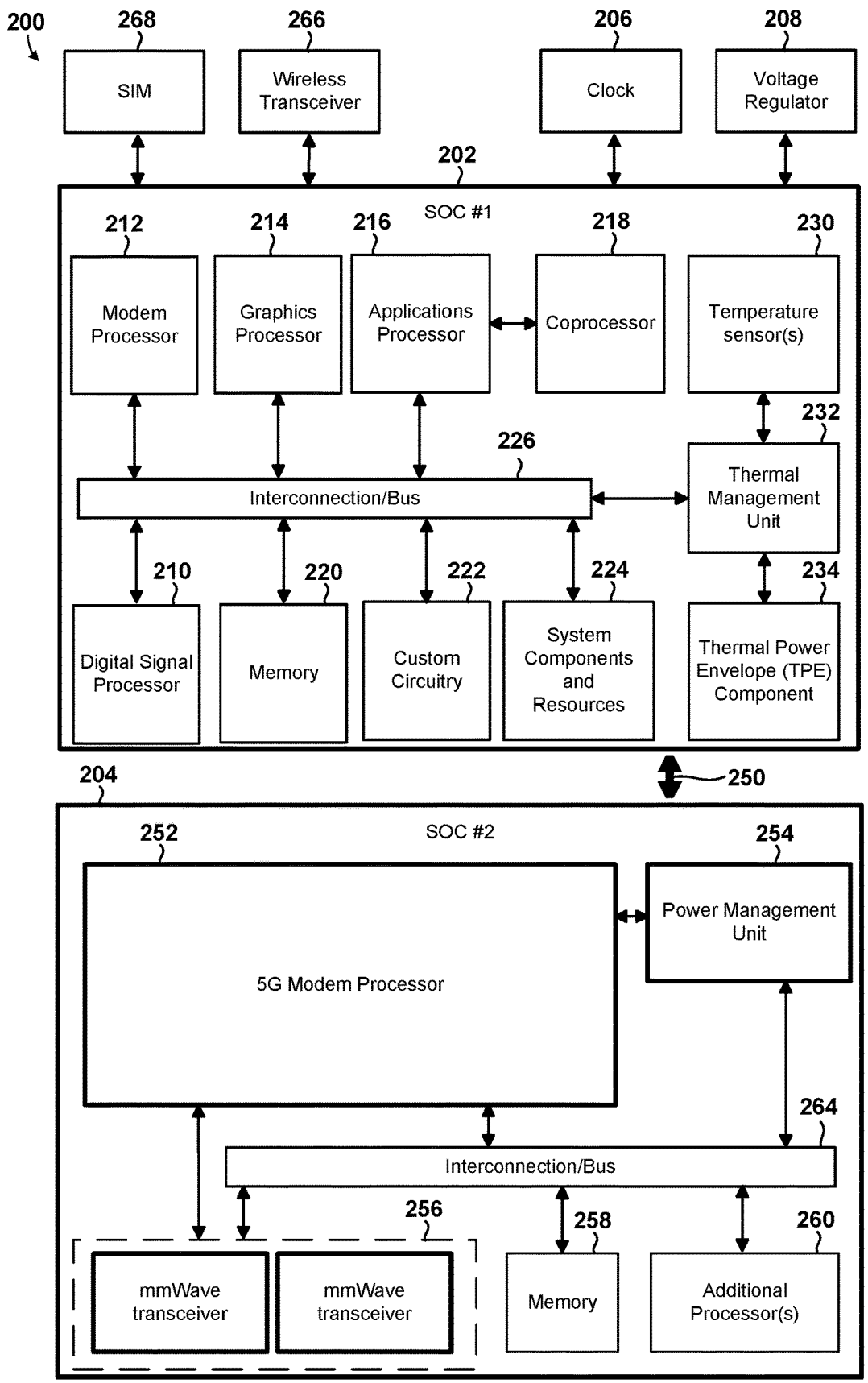
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example UE 200 (which may be a SIP in some embodiments) includes a two SOCs 202, 204 coupled to a clock 206, a voltage regulator 208, at least one SIM 268 and/or a SIM interface and a wireless transceiver 266 configured to send and receive wireless communications via an antenna (not shown) to/from network UEs, such as a base station (e.g., 110a). In some embodiments, the first SOC 202 operate as central processing unit (CPU) of the UE that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOCs 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a UE. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206, a voltage regulator 208, one or more wireless transceivers 266, and at least one SIM 268 and/or SIM interface (i.e., an interface for receiving one or more SIMs). Resources external to the SOC (e.g., clock 206, voltage regulator 208) may be shared by two or more of the internal SOC processors/cores. The at least one SIM 268 (or one or more SIMs coupled to one or more SIM interfaces) may store information supporting multiple subscriptions, including a first 5GNR subscription and a second 5GNR subscription in which the first 5GNR subscription and the second 5GNR subscription support service on a 5G non-standalone (NSA) network.

In addition to the example SIP 200 discussed above, various embodiments may be implemented in a wide variety of computing systems, which may include a single processor, multiple processors, multicore processors, or any combination thereof.

Figure 3:
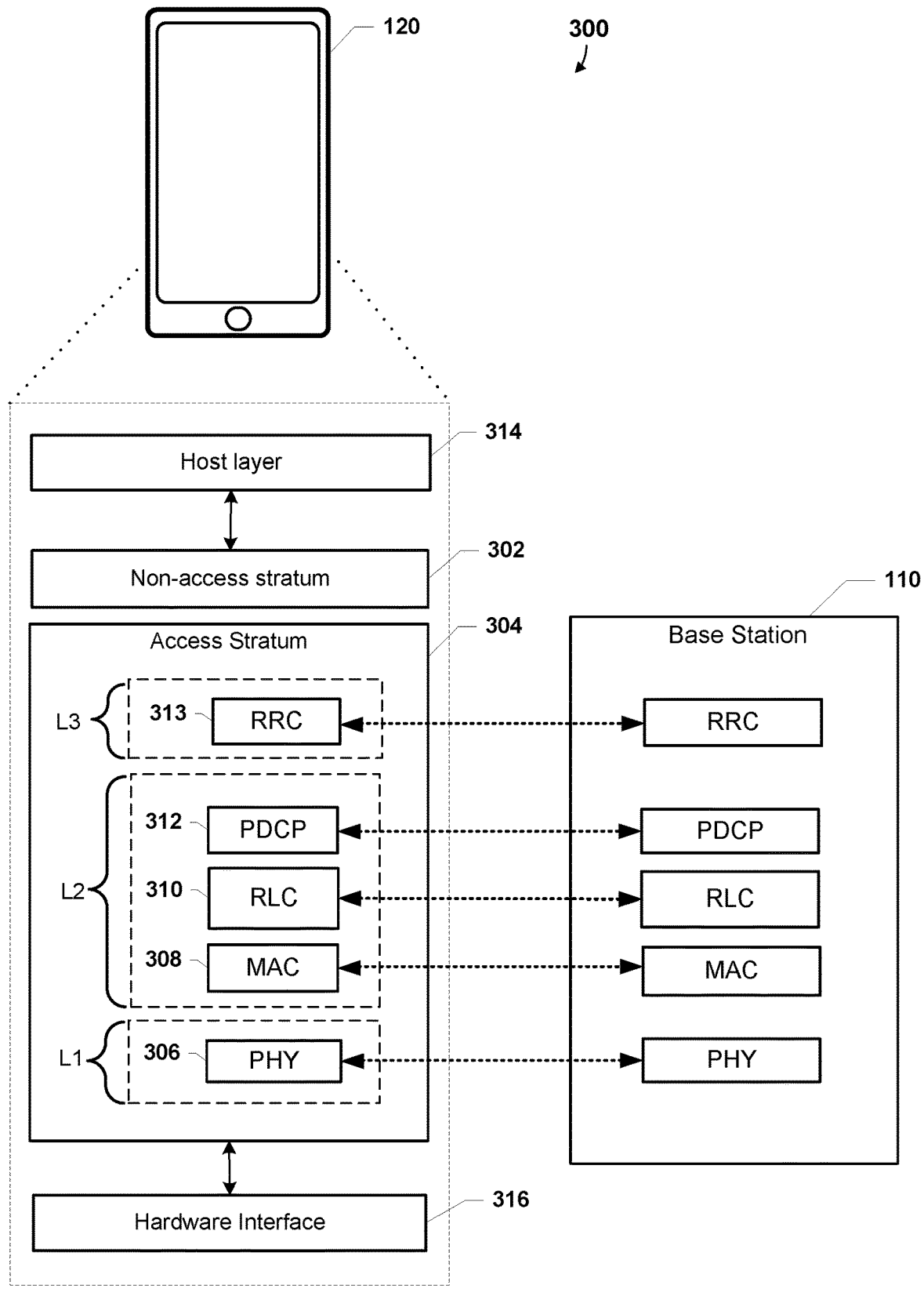
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the UE 120 (e.g., UEs 120a, 120b, and/or 120c) may implement the software architecture 300 to facilitate communication between the UE 120 and the base station 110 (e.g., the base stations 110a, 110b, and/or 110c) of a communication system (e.g., 100). In various embodiments, layers in software architecture 300 may form logical connections with corresponding layers in software of the base station 110. The software architecture 300 may be distributed among one or more processors (e.g., the processors 212, 214, 216, 218, 252, 260). While illustrated with respect to one radio protocol stack, in a multi-SIM (subscriber identity module) UE, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support Packet filtering, security management, mobility control, session management, and traffic and signaling between a SIM(s) of the UE and its core network 140. The AS 304 may include functions and protocols that support communication between a SIM(s) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the UE 120 and the base station 110 over the physical layer 306. In the various embodiments, Layer 2 may include a Media Access Control (MAC) sublayer 308, a Radio link Control (RLC) sublayer 310, and a Packet data convergence protocol (PDCP) 312 sublayer, each of which form logical connections terminating at the base station 110.

In the control plane, Layer 3 (L3) of the AS 304 may include a Radio Resource Control (RRC) sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the UE 120 and the base station 110.

In various embodiments, the PDCP sublayer 312 may provide uplink functions including multiplexing between different Radio bearers and logical channels, sequence number addition, handover data handling, integrity protection, ciphering, and header compression. In the downlink, the PDCP sublayer 312 may provide functions that include in-sequence delivery of data packets, duplicate data Packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the UE 120. In some embodiments, application-specific functions provided by the at least one host layer 314 may provide an interface between the software architecture and the general purpose processor.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
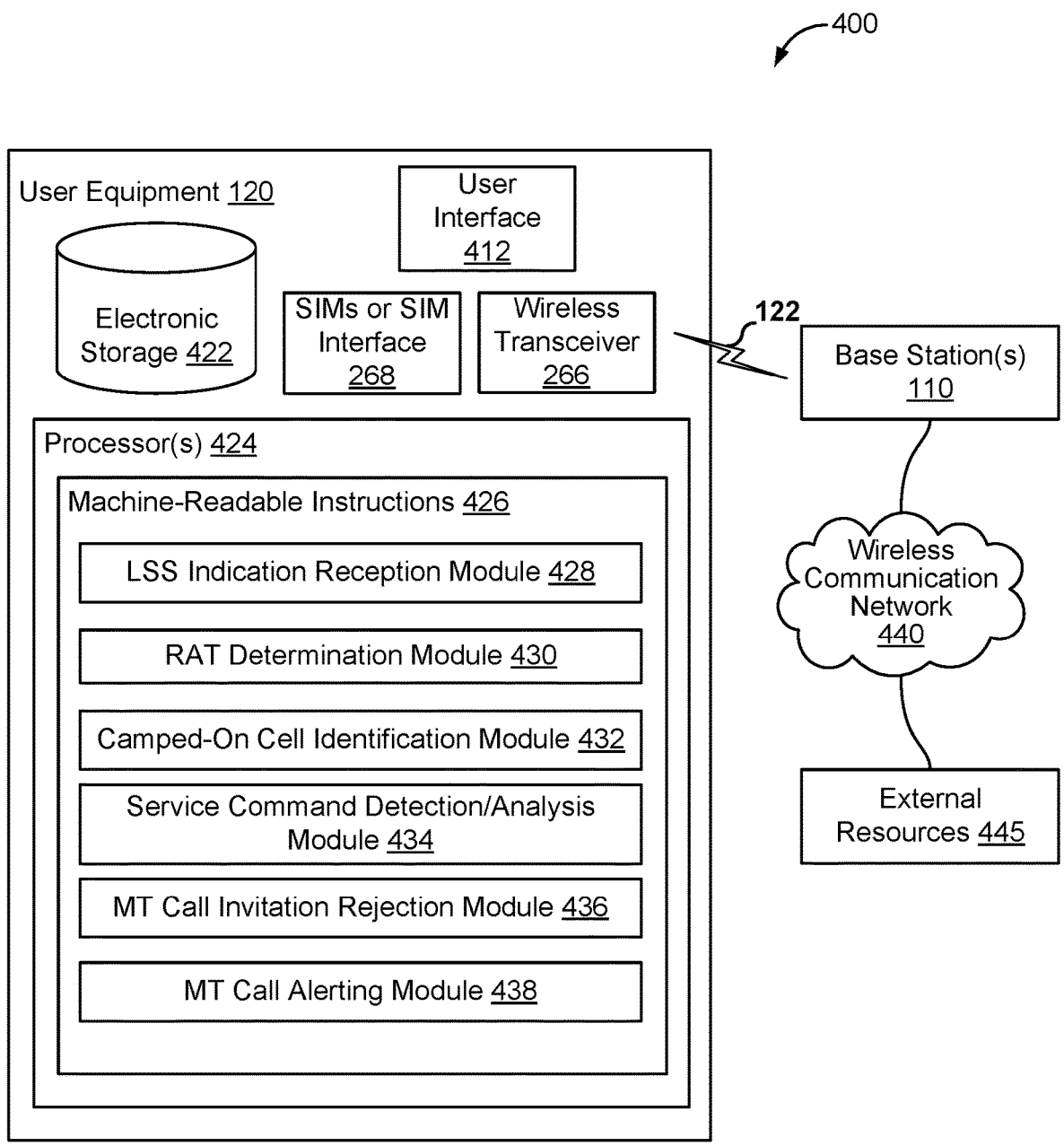
FIG. 4 is a component block diagram illustrating a communication system configured for wireless communication in accordance with various embodiments.

FIG. 4 is a component block diagram illustrating a communication system 400 configured for wireless communication in accordance with various embodiments. With reference to FIGS. 1-4, the communication system 400 may include the UE 120 (e.g., UEs 120a, 120b, and/or 120c) configured to communicate with one or more base station(s) 110 through a wireless communication link 122 (e.g., 5G-NR, LTE, Wi-Fi, Bluetooth, Ant, etc.), which may in-turn communicate with a wireless communication network 440, such as a cellular wireless communication network. The wireless communication network 440 may provide connections to external resources 445. External resources 445 may include sources of information outside of system 400, external entities participating with the system 400, and/or other resources.

The UE 120 may include electronic storage 422, one or more processors 424, a wireless transceiver 266, SIMs or SIM interface 268, a user interface 412, and other components. The UE 120 may include communication lines, or ports to enable the exchange of information with a network and/or other computing platforms. Illustration of the UE 120 in FIGS. 3 and 4 is not intended to be limiting. The UE 120 may include a plurality of hardware, software, and/or firmware components operating together to provide the functionality attributed herein to the UE 120.

Electronic storage 422 may include non-transitory storage media that electronically stores information. The electronic storage media of electronic storage 422 may include one or both of system storage that is provided integrally (i.e., substantially non-removable) with the UE 120 and/or removable storage that is removably connectable to the UE 120 via, for example, a port (e.g., a universal serial bus (USB) port, a firewire port, etc.) or a drive (e.g., a disk drive, etc.). Electronic storage 422 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 422 may include one or more virtual storage resources (e.g., cloud storage, a virtual private network, and/or other virtual storage resources). Electronic storage 422 may store software algorithms, information determined by processor(s) 424, information received from the user interface 412, information received from the base station(s) 110, external resources 445, and/or other information that enables the UE 120 to function as described herein.

Processor(s) 424 may be configured to provide information processing capabilities in the UE 120. As such, processor(s) 424 may include one or more of a digital processor, an analog processor, a digital circuit designed to process information, an analog circuit designed to process information, a state machine, and/or other mechanisms for electronically processing information. Although processor(s) 424 is shown in FIG. 4 as a single entity, this is for illustrative purposes only. In some embodiments, processor(s) 424 may include a plurality of processing units. These processing units may be physically located within the same device, or processor(s) 424 may represent processing functionality of a plurality of devices operating in coordination.

The UE 120 may be configured by machine-readable instructions 426. Machine-readable instructions 406 may include one or more instruction modules. The instruction modules may include computer program modules. The instruction modules may include one or more of an LSS indication reception module 426, an RAT determination module 430, a camped-on cell identification module 432, a service command detection/analysis module 434, an MT call invitation rejection module 436, an MT call the alerting module 438, and/or other instruction modules.

The LSS indication reception module 426 may be configured to receive the LSS indication via a user input on the user interface 412. The user interface 412 may be configured with a user interface option, enabling a user to select either to allow or reject MT call alerts during the LSS. As one example, at some point before or during the establishment of the LSS, the user interface 412 may prompt the user as to whether all incoming calls should be blocked (i.e., auto-rejection) or whether the user wishes to be notified, if possible without compromising the LSS, when an incoming call is being received (i.e., allowing MT call alerting). As another example, user settings of the UE 120 may enable the user to elect a user interface option configured to enable a user to select either allowing or rejecting MT call alerts during the LSS. As yet a further example, the LSS may remind or initiate a prompt to the user, after the LSS session is started, regarding the user interface option configured to enable a user to select either allowing or rejecting MT call alerts during the LSS. By way of a non-limiting example, the processor (e.g., 210, 212, 214, 216, 218, 252, 260) of the UE 120 may use the user interface 412 to receive the LSS indication, such as through a user input (e.g., the user choosing to be alerted about incoming calls, but only if such alerting does not negatively impact the LSS that is active on the UE. The LSS indication reception module 426 may store the received LSS indication in the electronic storage 422.

The RAT determination module 430 may be configured to determine a RAT used for an LSS currently active on the UE. In some embodiments, the RAT determination module 430 may determine the RAT in response to receiving an MT call invitation. The UE may receive a cell identification from the base station along with the MT call invitation and/or hand shaking processes. The UE may also keep a log of cell IDs to enable it to reconnect to that cell in case it drops coverage. As one example, the RAT determination module 430 may determine that the UE is currently using LSS while camped on an NR cell (e.g., macro cell 102a) providing 5G service. As another example, the RAT determination module 430 may determine that the UE is currently using LSS while camped on an LTE cell (e.g., base station LTE BS 110e) providing LTE service. As yet another example, the RAT determination module 430 may determine that the UE is currently camped-on a WiFi cell (i.e., using a WiFi access point) through a local WiFi BS 110g) providing very high-speed data service with very low latency. By way of a non-limiting example, the processor (e.g., 210, 212, 214, 216, 218, 252, 260) of the UE 120 may determine the RAT used for LSS. The RAT determination module 430 may store an indication of the determined RAT in the electronic storage 422.

The camped-on cell identification module 432 may be configured to determine whether a camped-on cell of the RAT, determined by the RAT determination module 430, is identified on an auto-reject list for MT call alerting. If the camped-on cell of the RAT is identified on the auto-reject list, all MT call received through that camped-on cell will be automatically rejected. The auto-reject list may be maintained in order to immediately recognize NR cells that likely cause latencies that may compromise LSS. As one example, the camped-on cell identification module 432 may keep track of whether individual NR cells use voice over NR (VoNR) with an EPS FB command, which may cause latencies. As a UE camps on new cells that use the EPS FB command, an identifier for that cell may be added to the auto-reject list for MT call alerting by the camped-on cell identification module 432. The auto-reject list may identify cells from base station or other core network (e.g., 140) identifiers. Alternatively, the core network may provide the UE with updates to the auto-reject list. As yet a further alternative, the UE may query unrecognized cell assets about whither they use the EPS FB command with VoNR in order to determine whether that cell should be added to the list. It should be understood that while an auto-reject list that is used by the camped-on cell identification module 432 to reject call from certain cell is described herein, alternatively an auto-accept list may be maintained and used that is used by the camped-on cell identification module 432 to accept AT calls from cells on the auto-accept list. Similarly, both auto-reject and auto-accepts lists may be maintained by the cell identification module 432 for identifying which cells to automatically reject or accept, accordingly. By way of a non-limiting example, the processor (e.g., 210, 212, 214, 216, 218, 252, 260) of the UE 120 may check an identifier of the camped-on cell to determine whether that camped-on cell is on the auto-reject list (or auto-accept list, if available). The camped-on cell identification module 432 may store identifiers for newly identified cells in the electronic storage 422.

The service command detection/analysis module 434 may be configured to determine whether a latency-prone service command is received by the UE. Latency-prone service commands include any instructions received from a camped-on cell that are likely to increase latency enough to impair the LSS noticeably. In particular, service commands that are configured to change the determined RAT used for the LSS to another RAT likely to compromise the LSS (e.g., EPS FB or SRVCC) are considered latency-prone service commands. The service command detection/analysis module 434 may detect any newly received service command and analyze that command to determine whether it is a latency-prone service command. As one example, typically when a UE (e.g., 120, 120a, 120b, 120c) is camping on an LTE cell during an active LSS, but an SRVCC service command is received during call establishment, the UE will move from LTE to WCDMA/GSM, which will impact the current LSS because typically WCDMA/GSM has lower throughput and higher system latency than LTE. Thus, if a received service command is a single radio voice call continuity (SRVCC) command associated with an LTE RAT used for the LSS, that service command will be considered a latency-prone service command. As another example, typically when the UE is camping on a NR cell during an active LSS, but an EPS FB service command is received during call establishment, the UE will move from NR to LTE, which will impact the current LSS because LTE generally has lower throughput and higher system latency than NR. Thus, if a received service command is an EPS FB command associated with a 5G-NR RAT used for the LSS, that service command will be considered a latency-prone service command. By way of a non-limiting example, the processor (e.g., 210, 212, 214, 216, 218, 252, 260) of the UE 120 may use a clock (e.g., 206) or other timer to wait a predetermined amount of time and if no latency-prone service command is received in that predetermined amount of time, the processor may conclude that a latency-prone service command is not received. The service command detection/analysis module 434 may access a database or other files stored in the electronic storage 422 in order to recognize latency-prone service commands.

The MT call invitation rejection module 436 may be configured to reject the MT call invitation in response to the service command detection/analysis module 434 determining that a latency-prone service command is received. The MT call invitation rejection module 436 may use the determinations made by the camped-on cell identification module 432 or the service command detection/analysis module 434 to reject MT calls. As one example, in response to the camped-on cell identification module 432 determining that the camped-on cell of the determined RAT is identified on the auto-reject list for MT call alerting, the MT call invitation rejection module 436 may reject the incoming MT call. As another example, in response to the service command detection/analysis module 434 determining that a latency-prone service command is received, the MT call invitation rejection module 436 may reject the incoming MT call. In addition to rejecting the MT call invitation, the MT call invitation rejection module 436 may also cause the UE to ignore any received latency-prone service command (e.g., EPS FB or SRVCC). By way of a non-limiting example, the processor (e.g., 210, 212, 214, 216, 218, 252, 260) of the UE 120 may use a wireless transceiver (e.g., 266) to transmit a "486" error code, which denotes that the MT call invitation was received by the UE, but the UE is currently not willing or able to take the MT call (i.e., busy), thus letting the network know the MT call is rejected.

The MT call alerting module 438 may be configured to allow MT call alerting in response to the service command detection/analysis module 434 determining that a latency-prone service command is not received. Alternatively, the MT call the alerting module 438 may be configured to allow MT call alerting in response to the RAT determination module 430 determining that the RAT used for the LSS is not likely to compromise the LSS while allowing MT call alerting. As one example, in response to the RAT determination module 430 determining that the RAT used for the LSS is WiFi, the MT call alerting module 438 may alert the user of the incoming MT call (e.g., voice or video call). As another example, in response to the service command detection/analysis module 434 determining that the received service command instructs the UE to change over to WiFi (i.e., a change-to-WiFi service command), the MT call alerting module 438 may alert the user of the incoming MT call (e.g., voice or video call). By way of a non-limiting example, the processor (e.g., 210, 212, 214, 216, 218, 252, 260) of the UE 120 may use a user interface (e.g., 412) to visually notify the user of the call, a speaker to generate a sound associated with an incoming call, and/or trigger a haptic vibrator to generate a vibration that may alert the user to the incoming call.

The UE 120, base station(s) 110, and/or external resources 445 may be operatively linked via one or more electronic communication links of the wireless communication network. For example, the wireless communication network may establish links via a network such as the Internet and/or other networks.

The processor(s) 424 may be configured to provide information processing capabilities in the UE 120. As such, the processor(s) 424 may include one or more of a digital processor, an analog processor, a digital circuit designed to process information, an analog circuit designed to process information, a state machine, and/or other mechanisms for electronically processing information. Although the processor(s) 424 is illustrated as a single entity, this is for illustrative purposes only. In some embodiments, the processor(s) 424 may include a plurality of processing units and/or processor cores. The processing units may be physically located within the same device, or processor(s) 424 may represent processing functionality of a plurality of devices operating in coordination. The processor(s) 424 may be configured to execute modules 428, 430, 432, 434, 436, 438, and/or other modules by software; hardware; firmware; some combination of software, hardware, and/or firmware; and/or other mechanisms for configuring processing capabilities on processor(s) 424. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 428, 430, 432, 434, 436, and/or 438 are illustrated as being implemented within a single processing unit, in embodiments in which the processor(s) 424 includes multiple processing units and/or processor cores. The description of the functionality provided by the different modules 428, 430, 432, 434, 436, and/or 438 described below is for illustrative purposes, and is not intended to be limiting, as any of modules 428, 430, 432, 434, 436, and/or 438 may provide more or less functionality than is described. For example, one or more of the modules 428, 430, 432, 434, 436, and/or 438 may be eliminated, and some or all of its functionality may be provided by other modules 428, 430, 432, 434, 436, and/or 438. As another example, the processor(s) 424 may be configured to execute one or more additional modules that may perform some or all of the functionality attributed below to one of the modules 428, 430, 432, 434, 436, and/or 438.

Figure 5A:
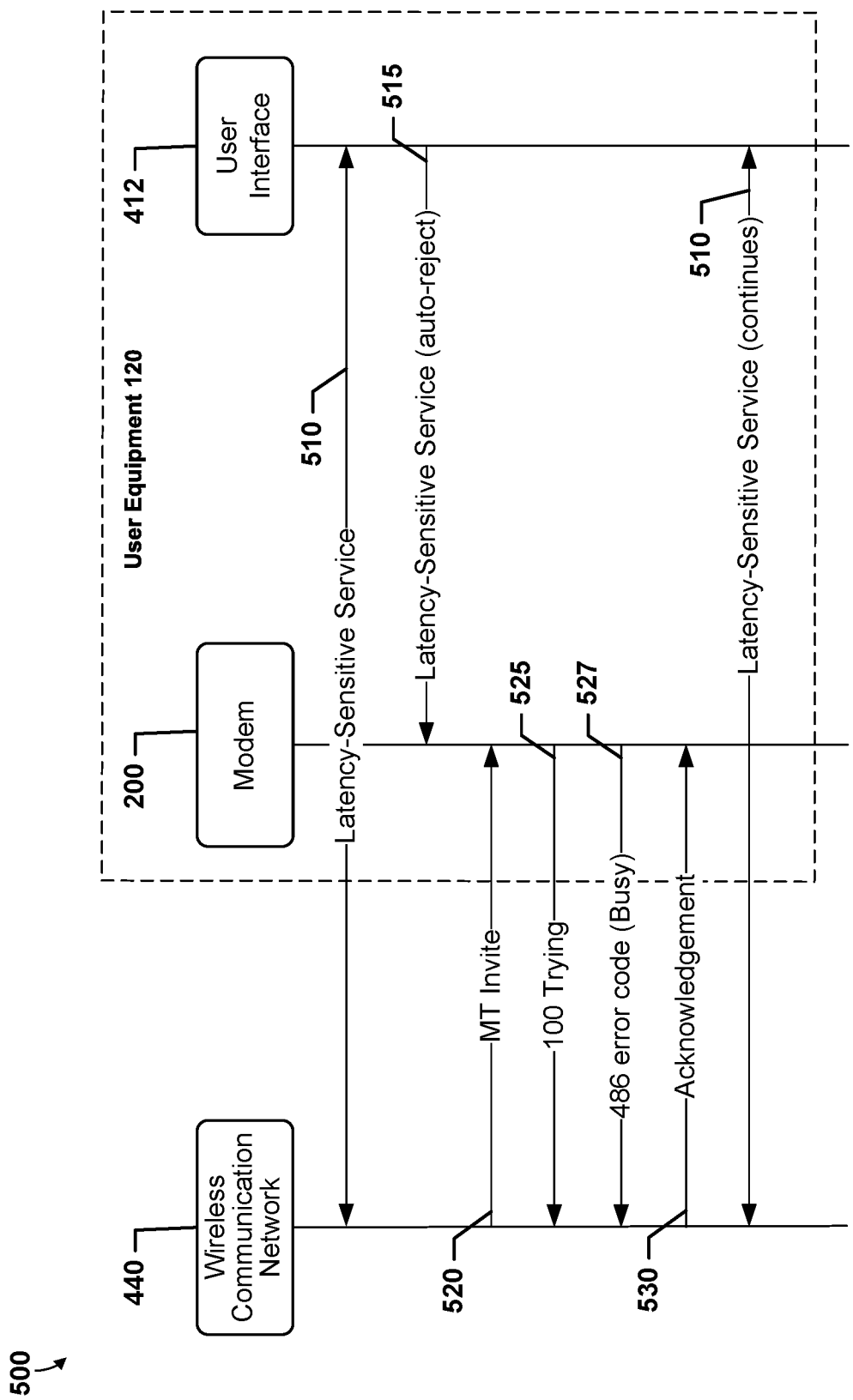
FIG. 5A is a communication flow diagram illustrating a method for automatically rejecting all MT calls for avoiding compromise to an LSS in accordance with various embodiments.
Figure 5B:
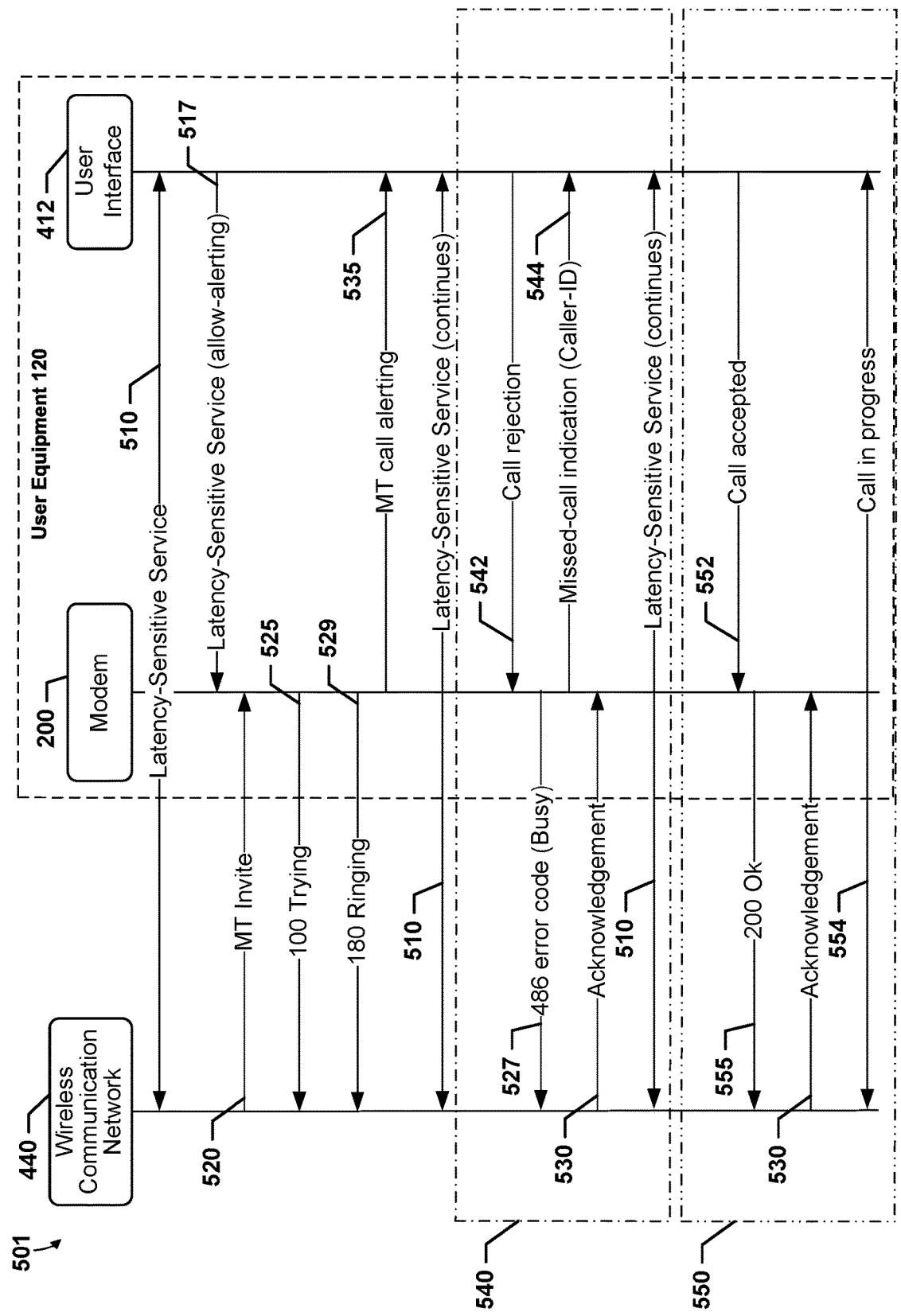
FIG. 5B is a communication flow diagram illustrating a method for allowing a user to selectively reject or accept MT calls that compromises an LSS in accordance with various embodiments.

FIGS. 5A and 5B are communication flow diagrams showing example interactions between a wireless communication network 440 (e.g., as shown in the communication system 100) and a UE 120 (e.g., 120a, 120b, 120c). In particular, the communications are between the wireless communication network 440 and a modem 200 and user interface 412 of the UE 120.

FIG. 5A is a communication flow diagram illustrating a method for automatically rejecting all MT calls for avoiding compromise to an LSS in accordance with various embodiments. With reference to FIGS. 1-5A, the communication flow 500 illustrates how when a user sets the system settings of the UE 120 to "auto-reject" all calls during an LSS, the user losses the chance to answer any incoming calls.

Initially, the communication flow 500 demonstrates how the Latency-Sensitive Service 510 is communicated between the wireless communication network 440, the modem 200, and the user interface 412. In order to avoid any possible interruptions (i.e., latency problems) with the active LSS, the user may use the user interface 412 to place the UE in a "do not disturb" mode, which will automatically reject all incoming calls. In this way, the user interface 412 will cause the processor of the UE 120 to convey a Latency-Sensitive Service (auto-reject) message 515 to the modem 200. Thereafter, when a MT call is attempted to the UE 120, the wireless communication network 440 will transmit a MT call invitation (i.e., MT Invite 520) to the modem 200, representing an incoming voice or video call. In response to receiving the MT Invite 520, the modem 200 will send a 100 Trying message 525 to the wireless communication network 440, which indicates that the MT Invite is being processed and may stop any retransmission timer the network may use before timing-out the call attempt. However, since the modem 200 previously received the Latency-Sensitive Service (auto-reject) message 515, the modem 200 will also transmit a 486 error code message 527, which indicates the UE is "Busy" and cannot accept the call. Upon receipt of the 486 error code message 527, the wireless communication network 440 will typically respond to the modem 200 with an Acknowledgement message 530. In this way, during and after the process of the MT call attempt being made to the UE 120, the Latency-Sensitive Service 510 continues uninterrupted and uncompromised by the incoming call.

FIG. 5B is a communication flow diagram illustrating a method for allowing a user to selectively reject or accept MT calls that compromises an LSS in accordance with various embodiments. With reference to FIGS. 1-5B, the communication flow 501 illustrates how when a user sets the system settings of the UE 120 to "allow alerting," although the user will be alerted to any incoming calls, the LSS may experience latencies that will compromise the LSS.

The communication flow 501 provides an example of how the Latency-Sensitive Service 510 is communicated between the wireless communication network 440, the modem 200, and the user interface 412. In order to allow alerts to come through during an active LSS, the user may use the user interface 412 to set the system setting of the UE to "allow-alerting" mode, which will automatically notify a user of all incoming calls. In this way, the user interface 412 will cause the processor of the UE 120 to convey a Latency-Sensitive Service (allow-alerting) message 517 to the modem 200. Thereafter, when a MT call is attempted to the UE 120, the wireless communication network 440 will transmit the MT Invite 520 message to the modem 200 and in response the modem 200 will send a 180 Ringing message 529 to the wireless communication network 440, which indicates that the UE is announcing the incoming call. Also, the modem 200 will send an MT call alerting message 535 to the user interface 412, which may generate a display notification, in addition to one or more of ringing, flashing, or vibrating of the UE 120. Although handling and generating the MT call alerting message 535 likely caused latencies in the active LSS 510, the user now has two alternative options; a reject the call option 540 or an answer (i.e., accept) the call option 550. The user must pick one or the other option 540, 550.

For the reject the call option 540, the user may use the user interface 412 to transmit a call rejection message 542. For example, the user may reject the call by pressing an on-screen selection to decline, hang-up, or otherwise pass on the call. Similarly, this type of user interface 412 input may come from a power button, voice command, or a remote accessory configured to perform the function of accepting and/or rejecting incoming calls. In response to receiving the call rejection message 542, the modem 200 may transmit the 486 error code message 527 and receive the acknowledgement message 530. In this way, during and after the process of the MT call attempt being made to the UE 120, the Latency-Sensitive Service 510 may get interrupted, but after the call is rejected the LSS 510 may continue uncompromised thereafter. Also, in response to receiving the call rejection message 542, the modem 200 may provide a missed-call indication (e.g., caller ID information) to the user face to inform the user about the calling party.

For the answer the call option 550, the user may use the user interface 412 to transmit a call accepted message 552. For example, the user may answer the call by pressing an on-screen selection to answer or otherwise accept the call. Similarly, this type of user interface 412 input may come from a voice command or a remote accessory configured to perform the function of accepting and/or rejecting incoming calls. In response to receiving the call accepted message 552, the modem 200 may transmit a 200 Ok message 555 to the wireless communication network 440, which indicates success in establishing the call, to which the wireless communication network 440 will respond with an acknowledgement message 530. In this way, during the process of the MT call attempt being made to the UE 120, the Latency-Sensitive Service 510 may get interrupted, but after the call is accepted the LSS 510 is terminated and the call is maintained in progress (i.e., Call in progress 554) between the wireless communication network 440, the modem 200, and the user interface 412.

Figure 6A:
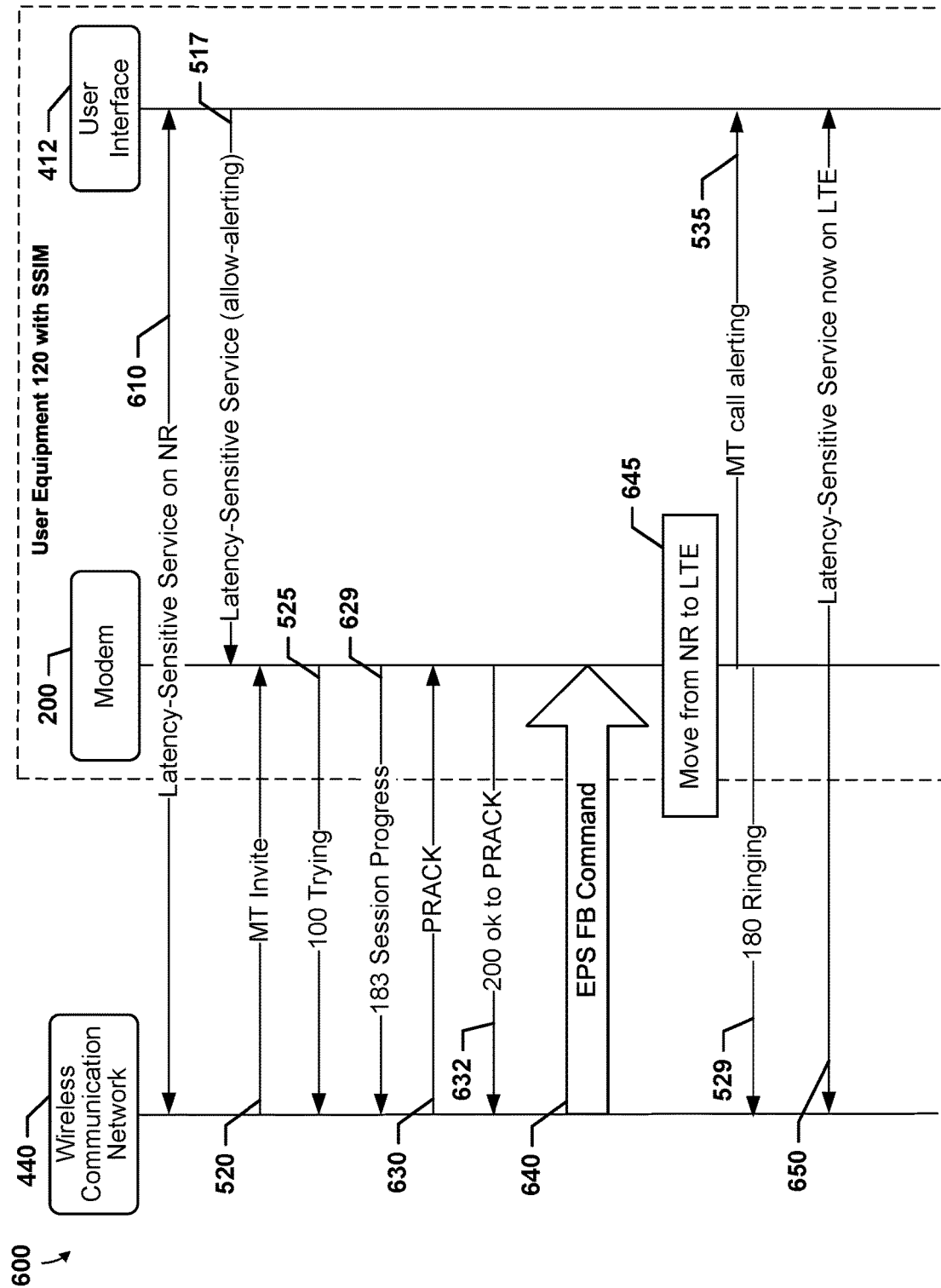
FIG. 6A is a communication flow diagram illustrating a method allowing a user to selectively reject or accept MT calls on an SSIM UE that compromises an LSS in accordance with various embodiments.
Figure 6B:
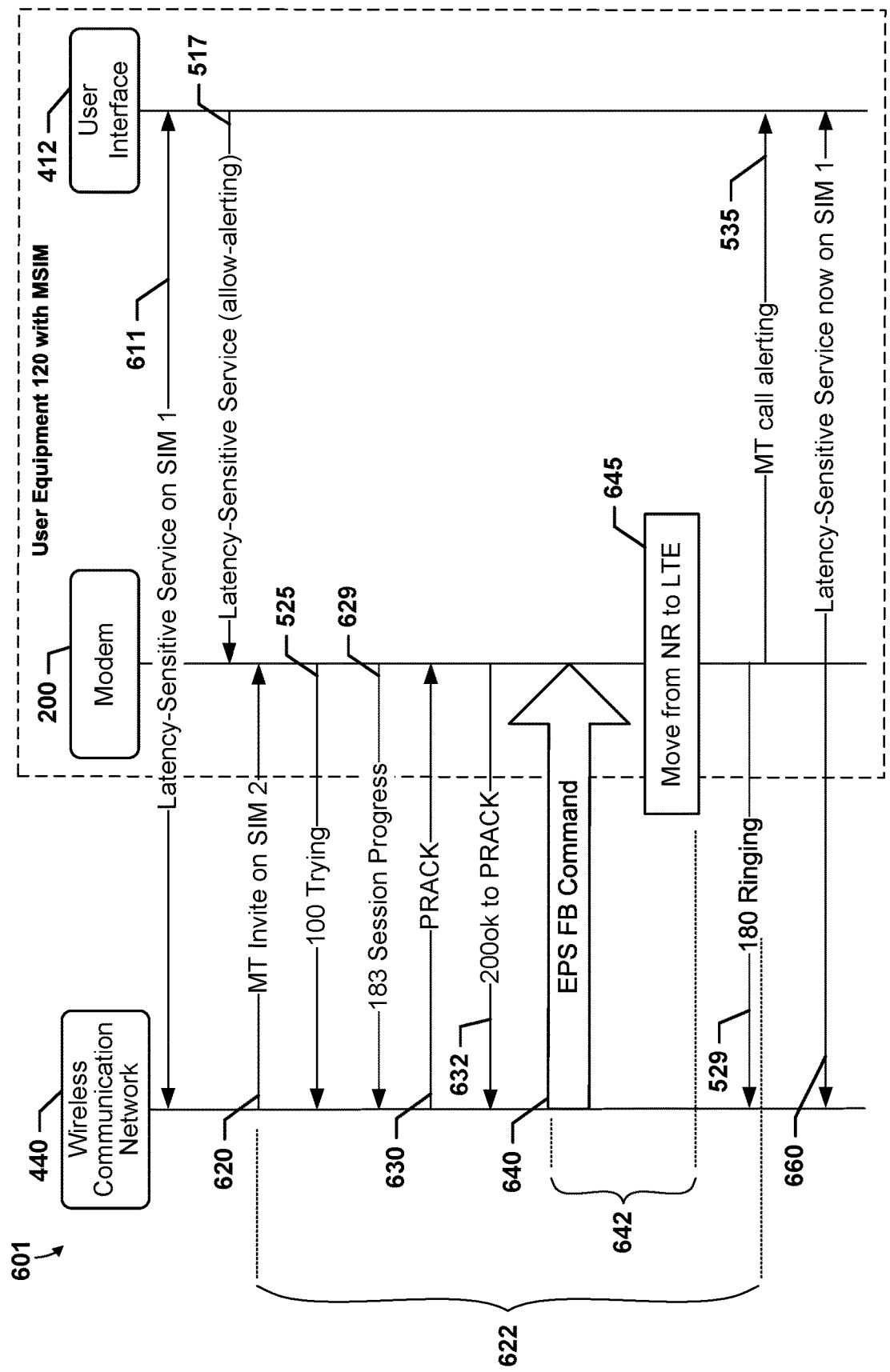
FIG. 6B is a communication flow diagram illustrating a method allowing a user to selectively reject or accept MT calls on an MSIM UE that compromises an LSS in accordance with various embodiments.

FIGS. 6A and 6B are communication flow diagrams showing example interactions between a wireless communication network 440 (e.g., as shown in the communication system 100) and an SSIM and MSIM UE 120 (e.g., 120a, 120b, 120c), respectively. In particular, the communications are between the wireless communication network 440 and a modem 200 and user interface 412 of the UEs.

FIG. 6A is a communication flow diagram illustrating a method for allowing a user to selectively reject or accept MT calls, specifically on an SSIM UE, that compromises an LSS in accordance with various embodiments. With reference to FIGS. 1-6A, the communication flow 600 illustrates how when a user sets the system settings of the UE 120 with SSIM to "allow alerting," although the user will be alerted to any incoming calls, the LSS may experience latencies that will compromise the LSS.

Initially, the communication flow 600 demonstrates how the Latency-Sensitive Service on NR 610 is communicated between the wireless communication network 440, the modem 200, and the user interface 412. In order to implement a setting to allow alerts to come through during an active LSS, the user may use the user interface 412 to convey a Latency-Sensitive Service (allow-alerting) message 517 to the modem 200. Thereafter, when a MT call is attempted to the UE 120, the wireless communication network 440 will transmit the MT Invite 520 message to the modem 200 and in response the modem 200 will send the 100 Trying message 525 to the wireless communication network 440. Also, the modem 200 will send a 183 Session Progress message 629 to the wireless communication network 440, which contains a session description protocol (SDP) and allows for regional ring-back and carrier announcements as well. Once the 183 Session Progress message 629 is received, the wireless communication network 440 may transmit a Provisional Response Acknowledgement (PRACK) message 630 to the modem 200. The PRACK message 630 plays the same role as acknowledgement message (e.g., 530), but for provisional responses. If the modem 200 accepts and/or finds a matching provisional response to the PRACK message 630, the modem will send a 200 ok to PRACK message 632 back to the wireless communication network 440. To improve key performance indicators (KPI), the wireless communication network 440 transmits an EPS FB command 640 to the modem 200. However, the EPS FB command is a latency-prone service command. In particular, receipt of the EPS FB command 640 triggers a Move from NR to LTE 645 (i.e., moving the call connection to a different RAT), which may cause significant latencies in the LSS. Thereafter, the modem 200 will transmit the MT call alerting message 535 to the user interface 412 and a 180 Ringing message 529 to the wireless communication network 440. Although working up to and generating the MT call alerting message 535 likely caused latencies in the active LSS on NR 610, the user now has two alternative options; reject the call or answer the call option, but regardless the Latency-Sensitive Service is now on LTE 650, as opposed to NR as it was before the call.

Thus, when the SSIM UE is handling an LSS, is camping on an NR cell, and an MT call comes in, the NR cell may trigger an EPS FB command during call establishment, which forces the UE to move from NR to LTE. Although LTE may provide faster and less latency-prone service than WCDMA/GSM, LTE nonetheless has lower throughput and higher system latency than NR, which means the LSS may be negatively impacted.

Similarly, when an SSIM UE with a single RF resource is handling an LSS, is camped on a cell that uses LTE, and an MT call comes in, a single radio voice call continuity command (SRVCC) may be received by the UE during call establishment. Like the EPS FB in the NR context, the SRVCC in the LTE context is a latency-prone service command that forces the UE to move from LTE to wideband code division multiple access/global system for mobile communications (WCDMA/GSM). WCDMA/GSM provides a significantly lower throughput and higher system latency than LTE, which means the LSS will be negatively impacted. Also, GSM will not support circuit switching and packet switching concurrency, which means voice call cannot be handled while a data session is ongoing.

FIG. 6B is a communication flow diagram illustrating a method for allowing a user to selectively reject or accept MT calls, specifically on an MSIM UE, that compromises an LSS in accordance with various embodiments. With reference to FIGS. 1-6B, the communication flow 601 illustrates how when a user sets the system settings of the UE 120 to "allow alerting," although the user will be alerted to any incoming calls, the LSS may experience latencies that will compromise the LSS. Although the UE 120 now has more than one SIM, the LSS on one SIM may still be compromised and/or interrupted when a call comes in on the other SIM.

Initially, the communication flow 601 demonstrates how the Latency-Sensitive Service on SIM 1 session 611 is communicated between the wireless communication network 440, the modem 200, and the user interface 412. In order to allow alerts, the Latency-Sensitive Service (allow-alerting) message 517 is conveyed from the user interface 412 to the modem 200. Thereafter, when a MT call is attempted to the UE 120 on SIM 2, the wireless communication network 440 will transmit the MT Invite on SIM 2 message 620 to the modem 200, which is followed by the 100 Trying message 525, the 183 Session Progress message 629, the PRACK message 630, and the 200 ok to PRACK message 632, as described above with regard to the communication flow 600. As in the single SIM scenario described above, this multi SIM scenario also involves the wireless communication network 440 transmitting the EPS FB command 640 to the modem 200, which triggers a Move from NR to LTE 645 and causes significant latencies in the LSS. Thereafter, the modem 200 will similarly transmit the MT call alerting message 535 to the user interface 412 and a 180 Ringing message 529 to the wireless communication network 440, after which the LSS will be supported by wireless service on the SIM-1 network 660. As with the single SIM scenario described above, the LSS experiences a total interruption period 622 from the receipt by the modem 200 of the MT invite on SIM 2 message 620 till after the 180 Ringing message 529 is transmitted from the modem 200. Within the total interruption period 622, the fallback period 642 from when the EPS FB command 640 is received by the modem 200 until when the LSS is moved from NR to LTE may cause the most significant delay.

Thus, when an MSIM UE with a single RF resource is handling an LSS on one SIM, is camping on an NR cell, and receives an MT call on another SIM, the NR cell will trigger EPS FB during the call establishment. Receipt of the EPS FB command by the UE will move the other SIM to LTE, causing an interruption (e.g., about 1.5 seconds) to the current LSS, which will be disruptive.

Figure 7:
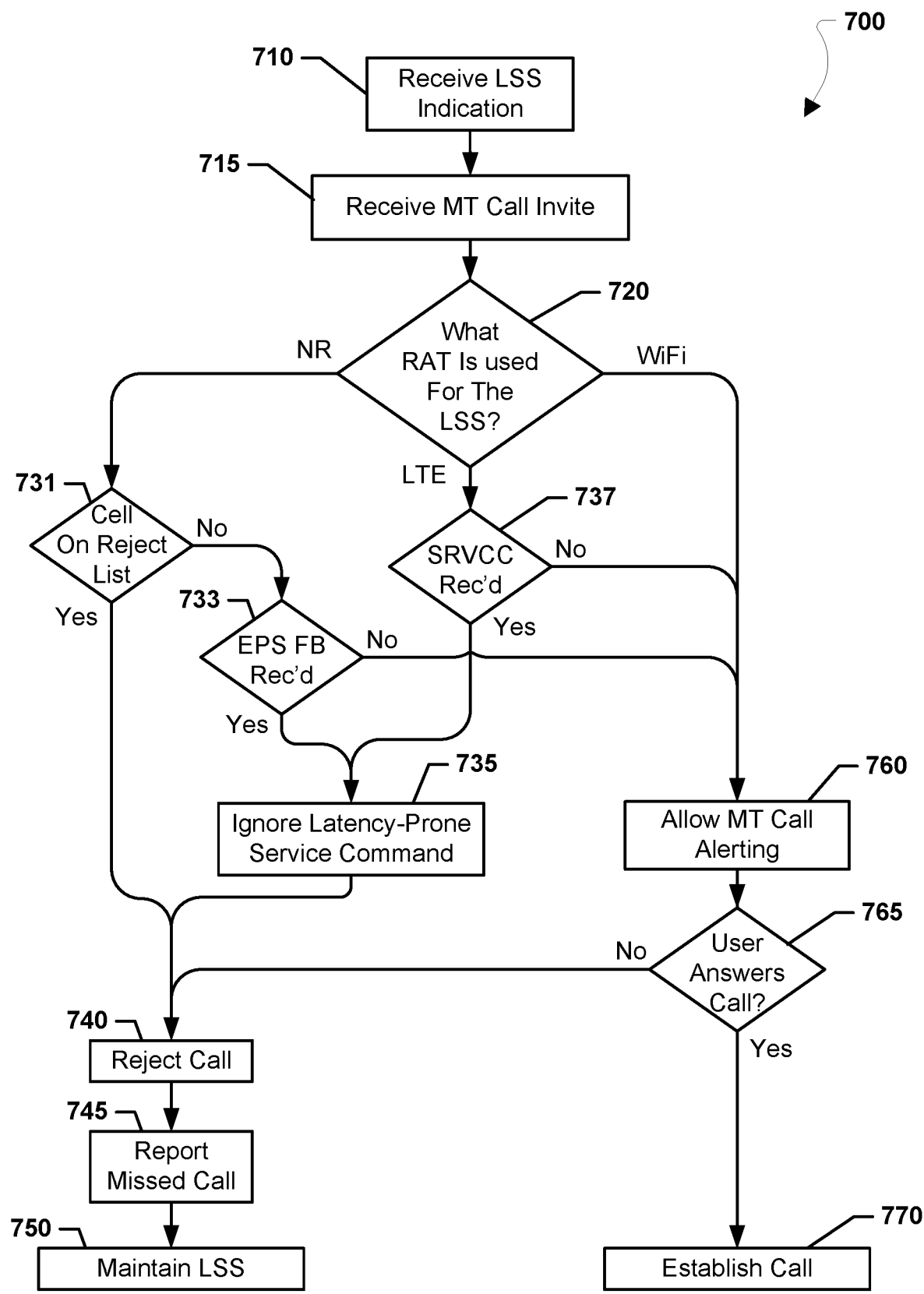
FIG. 7 is a process flow diagram illustrating a method for handling MT calls in accordance with various embodiments.

FIG. 7 is a process flow diagram illustrating a method 700 that may be executed by a processor of a UE for handling MT calls in accordance with various embodiments. With reference to FIGS. 1-7, the method 700 may be implemented by one or more processors (e.g., 202, 204, 210, 212, 214, 216, 218, 252, 260, 424) of a UE (e.g., 120, 120*a*, 120*b*, 120*c*). In some embodiments, the operations of method 700 may be performed by a processor of a UE, which may be a SSIM or an MSIM UE.

In block 710, the processor of the UE may perform operations including receiving an LSS indication that the UE is using the LSS. The processor may receive the LSS indication from a user input on a user interface option (e.g., presented on a user interface 412) configured to enable a user to select either allowing or rejecting MT call alerts during the LSS. Thus, using the user interface option, the user may opt to provide the processor with the LSS indication, which makes the processor aware that an LSS is in progress. Alternatively, the processor may receive the LSS indication automatically when an LSS session is initiated on the UE. To receive the LSS indication, the processor may use the LSS indication reception module 428 and/or a modem (e.g., 200) of the UE. Means for performing the operations of block 710 may include a processor (e.g., 202, 204, 210, 212, 214, 216, 218, 252, 260, 424) coupled to memory (e.g., 220, 258, 325) and related components.

In block 715, the processor may receive an MT Call Invite (e.g., MT Call Invite 520), representing an incoming voice or video call. The processor may receive the MT Call Invite from a wireless communication network (e.g., 440). Means for performing the operations of block 715 may include a processor (e.g., 202, 204, 210, 212, 214, 216, 218, 252, 260, 424) coupled to memory (e.g., 220, 258, 325) or from a remote source, such as base station(s) (e.g., 110) or external resources (e.g., 445) using a transceiver (e.g., 256, 266) and related components.

In determination block 720, the processor may determine what RAT is used for the LSS currently active on the UE. The determination regarding the RAT used for the LSS may be in response to receiving the MT Call Invite in block 715.

To determine the RAT, the processor may use the RAT determination module (e.g., 430). In accordance with various embodiments, determination block 720 may detect one of three different RATs, namely NR, LTE, and WiFi. For illustrative purposes, the process flow diagram in FIG. 7 only shows three different RAT that may be detected in determination block 720, however, it should be understood that one or more other RATs may be detected in determination block 720. Any additional RAT's may be handled like the most similar RAT (i.e., NR, LTE, and WiFi) described herein with regard to the method 700. Means for performing the operations of block 710 may include a processor (e.g., 202, 204, 210, 212, 214, 216, 218, 252, 260, 424) coupled to memory (e.g., 220, 258, 325) and related components.

In response to the processor determining that the RAT is NR (i.e., determination block 720="NR"), the processor may determine whether a camped-on cell used for the NR is on an auto reject list (i.e., "Cell On Reject List") in determination block 731. In response to the processor determining that the RAT is LTE (i.e., determination block 720="LTE"), the processor may determine whether a SRVCC command is received in determination block 737. In response to the processor determining that the RAT is WiFi (i.e., determination block 720="WiFi"), the processor may allow MT call alerting in block 760.

In determination block 731, to determine whether the camped-on cell used for the NR is on an auto reject list for MT call alerting, the processor may use the camped-on cell identification module (e.g., 432). Means for performing the operations of determination block 731 may include a processor (e.g., 202, 204, 210, 212, 214, 216, 218, 252, 260, 424) coupled to memory (e.g., 220, 258, 325) and related components. In response to the processor determining that the camped-on cell used for the NR is on the auto reject list for MT call alerting (i.e., determination block 731 "Yes"), the processor may reject the call in block 740. In response to the processor determining that the camped-on cell used for the NR is not on the auto reject list for MT call alerting (i.e., determination block 731 "No"), the processor may determine whether an EPS FB command (i.e., a latency-prone service command) is received in determination block 733.

In determination block 733, to determine whether an EPS FB command is received, the processor may use the service command detection/analysis module (e.g., 434). Means for performing the operations of determination block 733 may include a processor (e.g., 202, 204, 210, 212, 214, 216, 218, 252, 260, 424) coupled to memory (e.g., 220, 258, 325) and related components. In response to the processor determining that an EPS FB command is received (i.e., determination block 733 "Yes"), the processor may ignore the latency-prone service command (i.e., the EPS FB command) in block 735 and reject the call in block 740. In response the processor determining that an EPS FB command is not received (i.e., determination block 733 "No"), the processor may allow MT call alerting in block 760.

In block 735, to ignore the latency-prone service command the processor may use the MT call invitation rejection module 436. Means for performing the operations of block 735 may include a processor (e.g., 202, 204, 210, 212, 214, 216, 218, 252, 260, 424) coupled to memory (e.g., 220, 258, 325) and related components.

In determination block 737, to determine whether an SRVCC command is received, the processor may use the service command detection/analysis module (e.g., 434). Means for performing the operations of determination block 737 may include a processor (e.g., 202, 204, 210, 212, 214,

216, 218, 252, 260, 424) coupled to memory (e.g., 220, 258, 325) and related components. In response to the processor determining that an SRVCC command is received (i.e., determination block 737 "Yes"), the processor may ignore the latency-prone service command (i.e., the SRVCC command) in block 735 and reject the call in block 740. In response the processor determining that an SRVCC command is not received (i.e., determination block 737 "No"), the processor may allow MT call alerting in block 760.

In block 740, to reject the MT call the processor may use the MT call invitation rejection module (e.g., 436). Means for performing the operations of determination block 737 may include a processor (e.g., 202, 204, 210, 212, 214, 216, 218, 252, 260, 424) coupled to memory (e.g., 220, 258, 325) and related components.

In block 745, once the MT call is rejected in block 740, the processor may report the missed call. The missed call may be reported using the user interface (e.g., 412), which may provide visual, audio, and/or haptic feedback to a user regarding the missed call. For example, a message may be displayed on a display of the UE that indicates a call was missed. Means for performing the operations of block 745 may include a processor (e.g., 202, 204, 210, 212, 214, 216, 218, 252, 260, 424) coupled to memory (e.g., 220, 258, 325), a user interface (e.g., 412), and related components.

In block 750, the processor may maintain the LSS, which in accordance with various embodiment has now been maintained without compromising the LSS (i.e., increasing latency significantly). Means for performing the operations of block 750 may include a processor (e.g., 202, 204, 210, 212, 214, 216, 218, 252, 260, 424) coupled to memory (e.g., 220, 258, 325) or from a remote source, such as base station(s) (e.g., 110) or external resources (e.g., 445) using a transceiver (e.g., 256, 266) and related components.

In block 760, the processor may allow MT call alerting, following a determination in determination block 720 that WiFi is used for the LSS (i.e., determination block 720="WiFi"), a determination in determination block 733 that no EPS FB command is received (i.e., determination block 733="No"), or a determination in determination block 737 that no SRVCC command is received (i.e., determination block 737="No"). The processor may allow MT call alerting in block 760 using the MT call alerting module (e.g., 438). Means for performing the operations of block 745 may include a processor (e.g., 202, 204, 210, 212, 214, 216, 218, 252, 260, 424) coupled to memory (e.g., 220, 258, 325), a user interface (e.g., 412), and related components.

In determination block 765, following the operations in block 760, the processor may determine whether the user decided to accept the MT call (i.e., "User Answers Call?"). The processor may determine whether the user accepts or rejects the MT call from an input through a user interface (e.g., 412). Means for performing the operations of determination block 765 may include a processor (e.g., 202, 204, 210, 212, 214, 216, 218, 252, 260, 424) coupled to memory (e.g., 220, 258, 325), a user interface (e.g., 412), and related components. In response to determining that the user did not answer the call (i.e., determination block 765="No"), the processor may reject the call in block 740. In response to determining that the user answered the call (i.e., determination block 765="Yes"), the processor may establish the call in block 770, which also terminates the LSS. Means for performing the operations of block 770 may include a processor (e.g., 202, 204, 210, 212, 214, 216, 218, 252, 260, 424) coupled to memory (e.g., 220, 258, 325) or from a remote source, such as base station(s) (e.g., 110) or external resources (e.g., 445) using a transceiver (e.g., 256, 266) and related components.

Figure 8A:
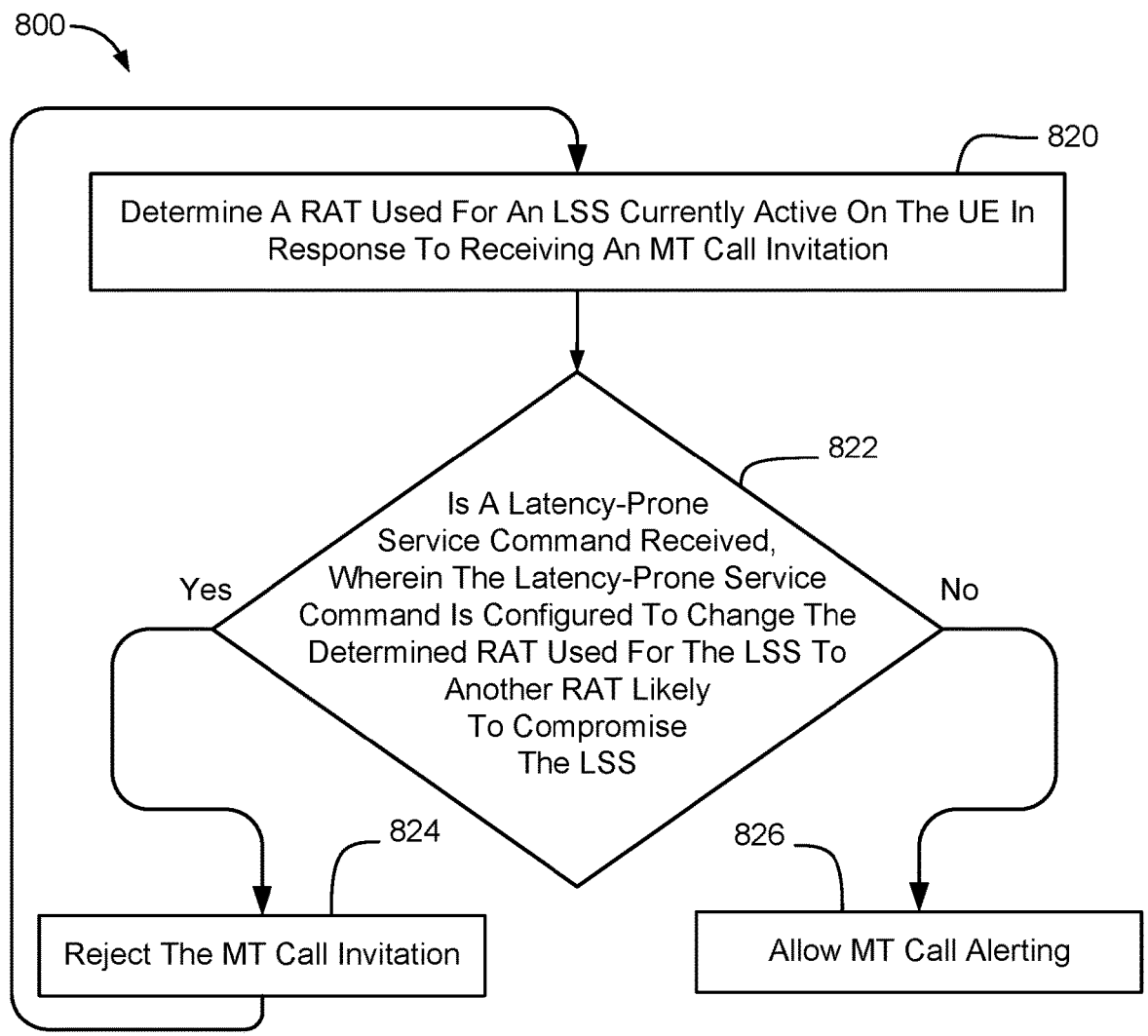
FIG. 8A is a process flow diagram illustrating a method for handling MT calls in accordance with various embodiments.

FIG. 8A illustrates a method 800 that may be executed by a processor of a UE for MT call handling in accordance with various embodiments. FIGS. 8B, 8C, 8D, 8E, 8F, and 8G illustrate additional or alternative operations in methods 801, 802, 803, 804, 805, and 806 that may be performed as part of the method 800 in some embodiments. The operations of the methods 800, 801, 802, 803, 804, 805, and 806 are intended to be illustrative. In some embodiments, methods 800, 801, 802, 803, 804, 805, and 806 may be accomplished with one or more additional operations not described, and/or without one or more of the operations discussed. Additionally, the order in which the operations of the methods 800, 801, 802, 803, 804, 805, and 806 are illustrated in FIGS. 8A, 8B, 8C, 8D, 8E, 8F, and 8G and described below is not intended to be limiting.

With reference to FIGS. 1-8G, the methods 800, 801, 802, 803, 804, 805, and 806 may be implemented in one or more processors (e.g., 202, 204, 210, 212, 214, 216, 218, 252, 260, 424) of a UE (e.g., 120, 120a, 120b, 120c) configured with processor-executable instructions stored on a non-transitory processor-readable storage medium. The one or more processors may include one or more devices configured through hardware, firmware, and/or software to be specifically designed for execution of one or more of the operations of the methods.

FIG. 8A illustrates a method 800 by which a processor of the UE may perform MT call handling in accordance with one or more embodiments.

In block 820, the processor may determine a RAT used for an LSS currently active on the UE in response to receiving an MT call invitation. To make the determination in block 820, the processor may use the RAT determination module (e.g., 430). In accordance with various embodiments, block 820 may detect one of three different RATs, namely NR, LTE, and WiFi. Means for performing the operations of block 820 may include a processor (e.g., 202, 204, 210, 212, 214, 216, 218, 252, 260, 424) coupled to memory (e.g., 220, 258, 325) or from a remote source, such as base station(s) (e.g., 110) or external resources (e.g., 445) using a transceiver (e.g., 256, 266) and related components.

In determination block 822, the processor may determine whether a latency-prone service command is received. Latency-prone service commands may include service commands configured to change the determined RAT used for the LSS to another RAT likely to compromise the LSS. For example, the latency-prone service command may be an EPS FB command associated with a 5G-NR RAT used for the LSS. Alternatively, the latency-prone service command may be an SRVCC command associated with an LTE RAT used for the LSS. To determine whether received service commands are latency-prone service commands, the processor may access a database, containing one or more data records, stored in memory (e.g., 220, 258) or from a remote source. Means for performing the operations of block 820 may include a processor (e.g., 202, 204, 210, 212, 214, 216, 218, 252, 260, 424) coupled to memory (e.g., 220, 258, 325) or from a remote source, such as base station(s) (e.g., 110) or external resources (e.g., 445) using a transceiver (e.g., 256, 266) and related components.

In response to the processor determining that a latency-prone service command is received (i.e., determination block 822="Yes"), the processor may reject the MT call invitation in block 824. In block 824, to reject the MT call the processor may use the MT call invitation rejection module (e.g., 436). Means for performing the operations of determination block 824 may include a processor (e.g., 202, 204, 210, 212, 214, 216, 218, 252, 260, 424) coupled to memory (e.g., 220, 258, 325) and related components. Following the operations in block 824, the processor may repeat the operations of the method 800 if/when another MT call invitation is received for another call.

In response to the processor determining that a latency-prone service command is not received (i.e., determination block 822="No"), the processor may allow MT call alerting in block 826. In block 826, to allow MT call alerting the processor may use the MT call alerting module (e.g., 438). Means for performing the operations of block 826 may include a processor (e.g., 202, 204, 210, 212, 214, 216, 218, 252, 260, 424) coupled to memory (e.g., 220, 258, 325), a user interface (e.g., 412), and related components.

Figure 8B:
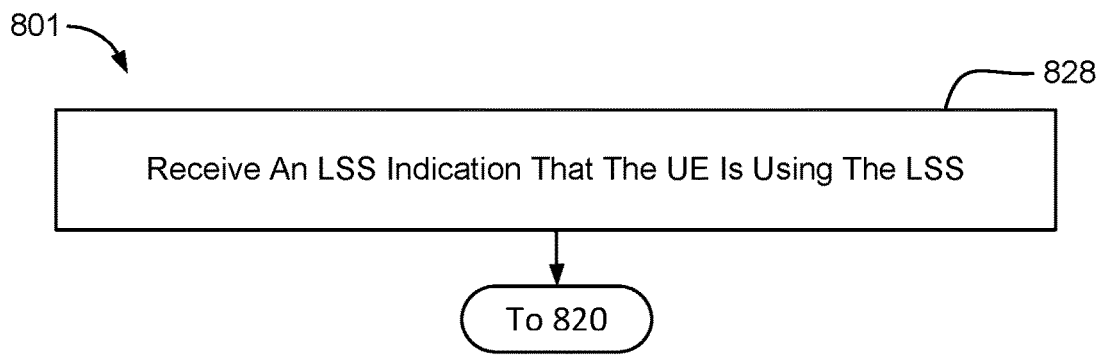
FIG. 8B is a process flow diagram illustrating a method for handling MT calls in which an LSS indication is received in accordance with various embodiments.

FIG. 8B illustrates a method 801 that may be executed by a processor of a UE for MT call handling in accordance with various embodiments. In block 828, the processor may receive an LSS indication that the UE is using the LSS. In some embodiments, the processor may receive the LSS indication via a user input on a user interface option configured to enable a user to select either allowing or rejecting MT call alerts during the LSS. To receive the LSS indication in block 828, the processor may use the LSS indication reception module (e.g., 428). Means for performing the operations of block 828 may include a processor (e.g., 202, 204, 210, 212, 214, 216, 218, 252, 260, 424) coupled to memory (e.g., 220, 258, 325) using a user interface (e.g., 412) and related components.

Following the operations in block 828, the processor may perform the operations in block 820 of the method 800 as described.

Figure 8C:
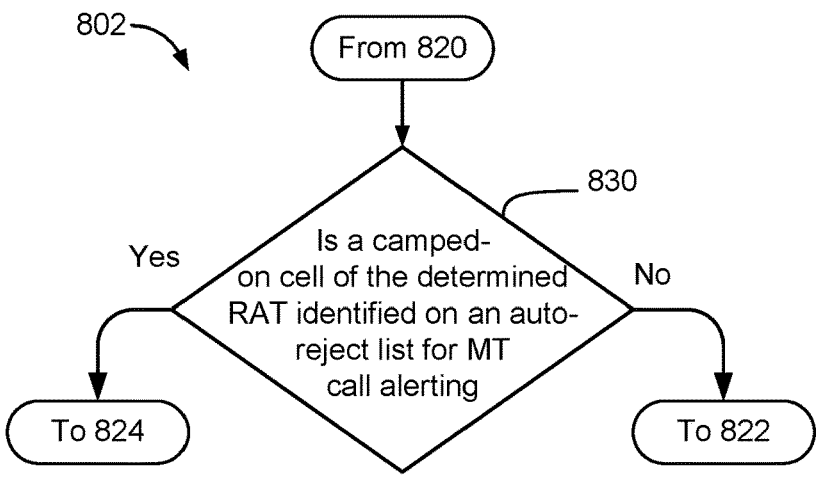
FIG. 8C is a process flow diagram illustrating a method for handling MT calls in which the camped-on cell is checked against an auto-reject list in accordance with various embodiments.

FIG. 8C illustrates a method 802 that may be executed by a processor of a UE for MT call handling in accordance with various embodiments. Following the operations in block 820 of the method 800, in determination block 830, the processor may determine whether a camped-on cell of the determined RAT is identified on an auto-reject list for MT call alerting. To determine whether the camped-on cell of the determined RAT is identified on an auto-reject list for MT call alerting in determination block 830, the processor may use the camped-on cell identification module (e.g., 432). Means for performing the operations of determination block 830 may include a processor (e.g., 202, 204, 210, 212, 214, 216, 218, 252, 260, 424) coupled to memory (e.g., 220, 258, 325) and related components.

In response to the processor determining that a camped-on cell of the determined RAT is identified on an auto-reject list for MT call alerting (i.e., determination block 830="Yes"), the processor may follow the operations in block 824 of the method 800, as described, to reject the MT call invitation.

In response to the processor deter mining that a camped-on cell of the determined RAT is not identified on the auto-reject list for MT call alerting (i.e., determination block 830="No"), the processor may follow the operations in determination block 822 of the method 800, as described, to determine whether a latency-prone service command is received.

Figure 8D:
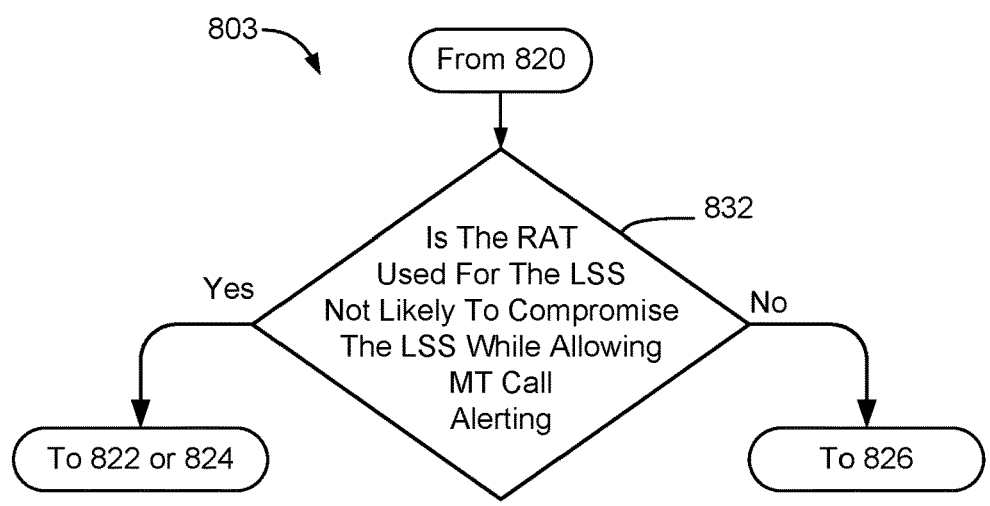
FIG. 8D is a process flow diagram illustrating a method for handling MT calls in which a determination is made as to whether the RAT used for the LSS is not likely to compromise the LSS while allowing MT call alerting, in accordance with various embodiments.

FIG. 8D illustrates a method 803 that may be executed by a processor of a UE for MT call handling in accordance with various embodiments. Following the operations in block 820 of the method 800, in determination block 832, the processor may determine whether the RAT used for the LSS is not likely to compromise the LSS while allowing MT call alerting. To determine whether the RAT used for the LSS is not likely to compromise the LSS while allowing MT call alerting in determination block 832, the processor may use the RAT determination module (e.g., 430). Means for performing the operations of determination block 832 may include a processor (e.g., 202, 204, 210, 212, 214, 216, 218, 252, 260, 424) coupled to memory (e.g., 220, 258, 325) and related components.

In response to the processor determining that the RAT used for the LSS is not likely to compromise the LSS while allowing MT call alerting (i.e., determination block 832="Yes"), the processor may follow the operations in determination block 822 of the method 800, as described, to determine whether a latency-prone service command is received. Alternatively, in response to the processor determining that the RAT used for the LSS is not likely to compromise the LSS while allowing MT call alerting (i.e., determination block 832="Yes"), the processor may follow the operations in block 824 of the method 800, as described, to allow MT call alerting.

In response to the processor determining that the RAT used for the LSS is likely to compromise the LSS while allowing MT call alerting (i.e., determination block 832="No"), the processor may follow the operations in block 826 of the method 800, as described, allow MT call alerting.

Figure 8E:
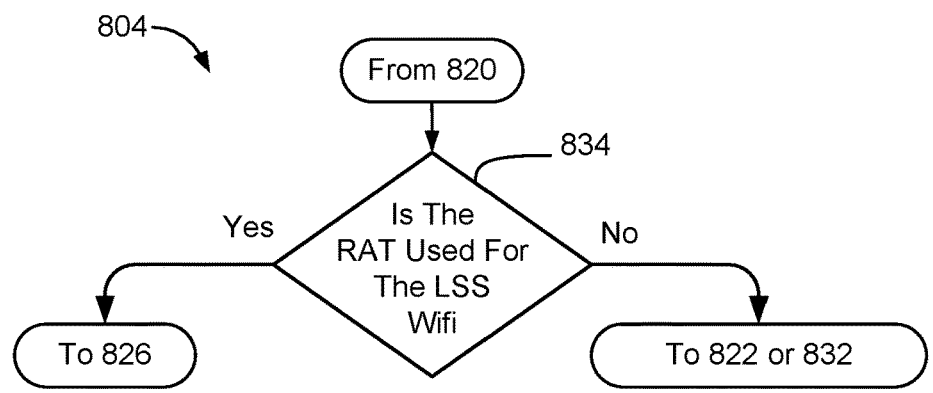
FIG. 8E is a process flow diagram illustrating a method for handling MT calls in which a determination is made as to whether the RAT used for the LSS is WiFi in accordance with various embodiments.

FIG. 8E illustrates a method 804 that may be executed by a processor of a UE for MT call handling in accordance with various embodiments. Following the operations in block 820 of the method 800, in determination block 834, the processor may determine whether the RAT used for the LSS is WiFi. To determine whether the RAT used for the LSS is WiFi in determination block 834, the processor may use the RAT determination module (e.g., 430). Means for performing the operations of determination block 834 include a processor (e.g., 202, 204, 210, 212, 214, 216, 218, 252, 260, 424) coupled to memory (e.g., 220, 258, 325) and related components.

In response to the processor determining that the RAT used for the LSS is WiFi (i.e., determination block 834="Yes"), the processor may follow the operations in block 826 of the method 800, as described, allow MT call alerting.

In response to the processor determining that the RAT used for the LSS is not WiFi (i.e., determination block 834="No"), the processor may follow the operations in determination block 822 of the method 800, as described, to determine whether a latency-prone service command is received. Alternatively, in response to the processor determining that the RAT used for the LSS is not WiFi (i.e., determination block 832="No"), the processor may follow the operations in block 832 of the method 803, as described, to determine whether the RAT used for the LSS is not likely to compromise the LSS while allowing MT call alerting.

Figure 8F:
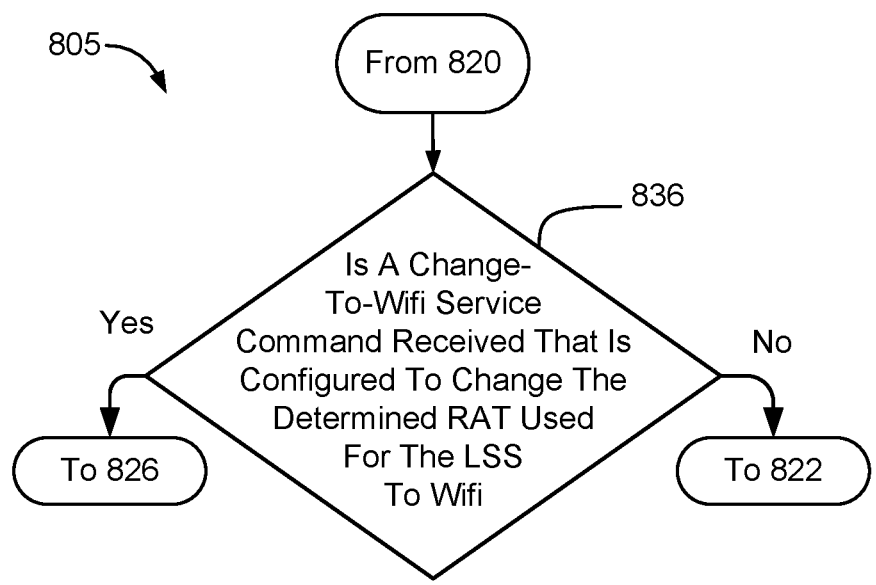
FIG. 8F is a process flow diagram illustrating a method for handling MT calls in which a determination is made as to whether a change-to-WiFi service command is received in accordance with various embodiments.

FIG. 8F illustrates a method 805 that may be executed by a processor of a UE for MT call handling in accordance with various embodiments. Following the operations in block 820 of the method 800, in determination block 836, the processor may determine whether a change-to-WiFi service command is received that is configured to change the determined RAT used for the LSS to WiFi. To determine whether the change-to-WiFi service command is received in determination block 836, the processor may use the service command detection/analysis module (e.g., 434). Means for performing the operations of determination block 836 may include a processor (e.g., 202, 204, 210, 212, 214, 216, 218, 252, 260, 424) coupled to memory (e.g., 220, 258, 325) and related components.

In response to the processor determining that a change-to-WiFi service command is received (i.e., determination block 836="Yes"), the processor may follow the operations in block 826 of the method 800, as described, to allow MT call alerting.

In response to the processor determining that a change-to-WiFi service command is not received (i.e., determination block 836="No"), the processor may follow the operations in determination block 822 of the method 800, as described, to determine whether a latency-prone service command is received.

Figure 8G:
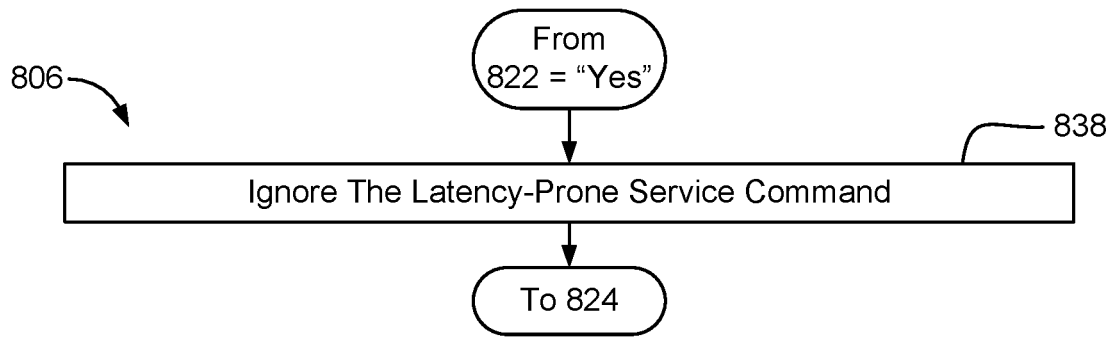
FIG. 8G is a process flow diagram illustrating a method for handling MT calls in which the received latency-prone service command is ignored in accordance with various embodiments.

FIG. 8G illustrates a method 806 that may be executed by a processor of a UE for MT call handling in accordance with various embodiments. Following the operations in determination block 822 of the method 800, in which the processor determined that a latency-prone service command is received (i.e., determination block 822="Yes"), the processor may ignore the latency-prone service command in block 838. To ignore the latency-prone service command in block 838, the processor may use the MT call invitation rejection module (e.g., 436). Means for performing the operations of block 838 may include a processor (e.g., 202, 204, 210, 212, 214, 216, 218, 252, 260, 424) coupled to memory (e.g., 220, 258, 325) using a user interface (e.g., 412) and related components.

Following the operations in block 838, the processor may perform the operations in block 824 of the method 800, as described, to reject the MT call invitation.

Figure 9:
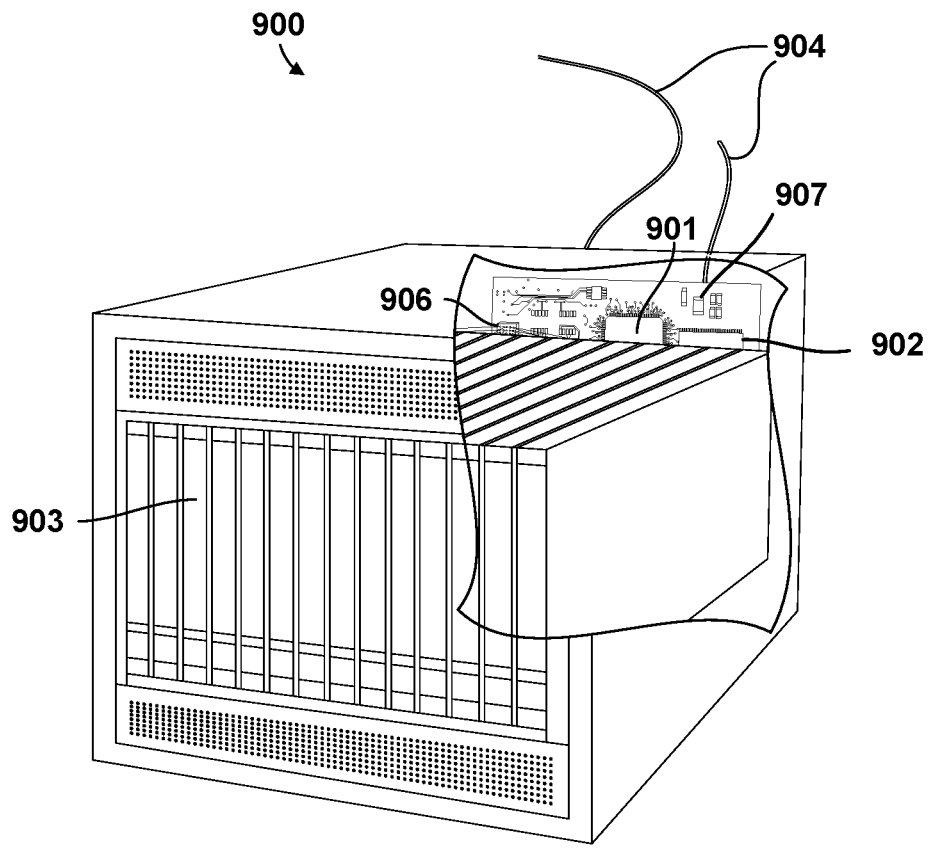
FIG. 9 is a component block diagram of a network computing device suitable for use with various embodiments.

FIG. 9 is a component block diagram of a network computing device 900 suitable for use with various embodiments. Such network computing devices may include at least the components illustrated in FIG. 9. With reference to FIGS. 1-9, the network computing device 900 may include a processor 901 coupled to volatile memory 902 and a large capacity nonvolatile memory, such as a disk drive 903. The network computing device 900 may also include a peripheral memory access device such as a floppy disc drive, compact disc (CD) or digital video disc (DVD) drive 906 coupled to the processor 901. The network computing device 900 may also include network access ports 904 (or interfaces) coupled to the processor 901 for establishing data connections with a network, such as the Internet and/or a local area network coupled to other system computers and servers. The network computing device 900 may include one or more antennas 907 for sending and receiving electromagnetic radiation that may be connected to a wireless communication link. The network computing device 900 may include additional access ports, such as USB, Firewire, Thunderbolt, and the like for coupling to peripherals, external memory, or other devices.

Figure 10:
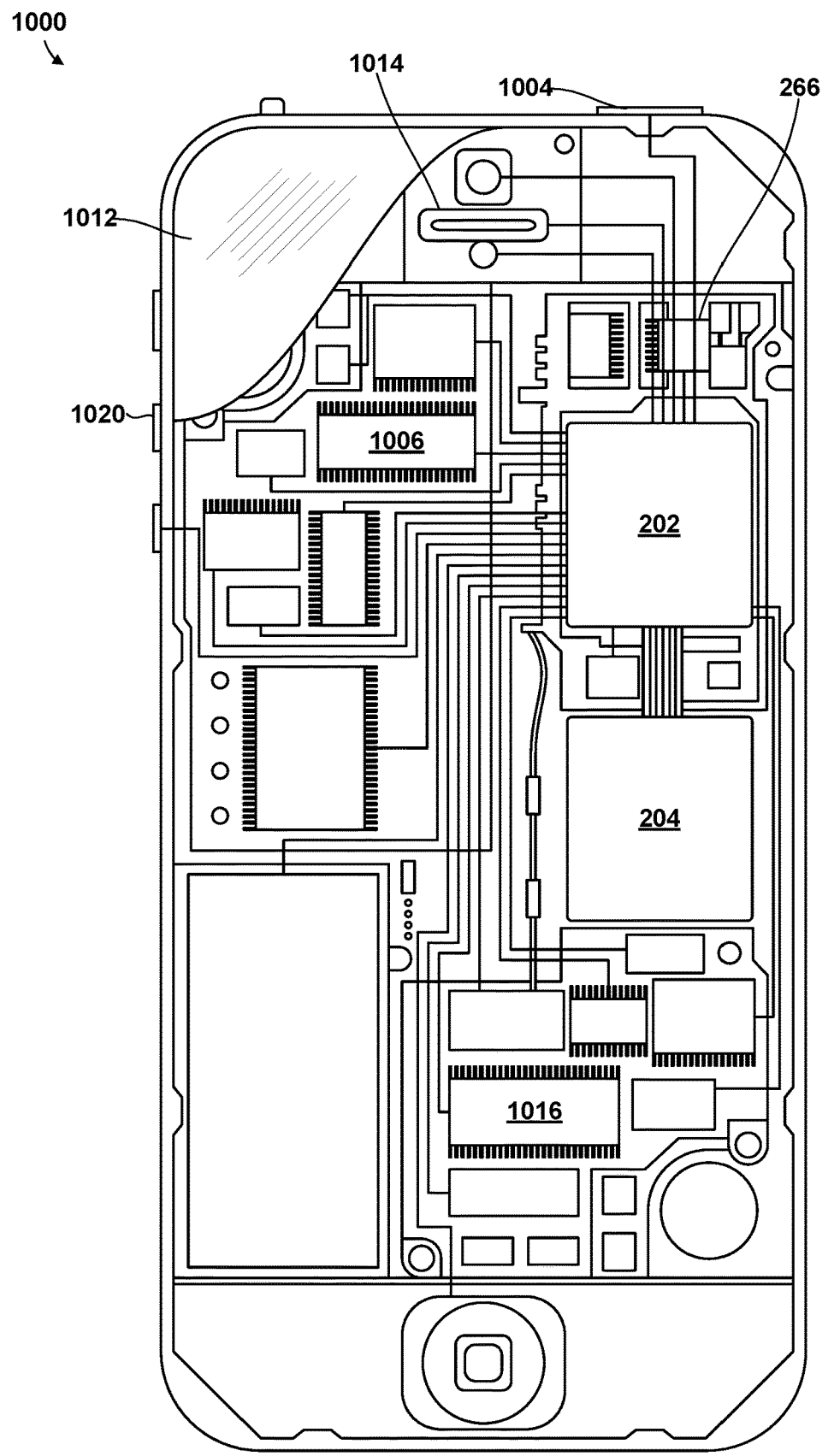
FIG. 10 is a component block diagram of a mobile computing device suitable for use with various embodiments.

FIG. 10 is a component block diagram of a UE 1000 suitable for use with various embodiments. With reference to FIGS. 1-10, various embodiments may be implemented on a variety of UEs 1000 (e.g., the UE 120, 120a, 120b, 120c), an example of which is illustrated in FIG. 10 in the form of a smartphone. The UE 1000 may include a first SOC 202 (e.g., a SOC-CPU) coupled to a second SOC 204 (e.g., a 5G capable SOC). The first and second SOCs 202, 204 may be coupled to internal memory 1006, 1016, a display 1012, and to a speaker 1014. The first and second SOCs 202, 204 may also be coupled to at least one SIM 268 and/or a SIM interface that may store information supporting a first 5GNR subscription and a second 5GNR subscription, which support service on a 5G non-standalone (NSA) network. Additionally, the UE 1000 may include an antenna 1004 for sending and receiving electromagnetic radiation that may be connected to a wireless transceiver 266 coupled to one or more processors in the first and/or second SOCs 202, 204. The UE 1000 may also include menu selection buttons or rocker switches 1020 for receiving user inputs.

The UE 1000 also includes a sound encoding/decoding (CODEC) circuit 1010, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 1010 may include a digital signal processor (DSP) circuit (not shown separately).

The processors of the wireless network computing device 900 and the UE 1000 may be any programmable microprocessor, microcomputer or multiple processor chip or chips that can be configured by software instructions (applications) to perform a variety of functions, including the functions of the various embodiments described below. In some UEs, multiple processors may be provided, such as one processor within an SOC 204 dedicated to wireless communication functions and one processor within an SOC 202 dedicated to running other applications. Software applications may be stored in the memory 422, 1016 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a UE and the UE may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), LTE systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general Packet Radio service (GPRS), code division multiple access (CDMA) systems (e.g., cdmaOne, CDMA1020TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method executed by a processor of a user equipment (UE) for handling mobile-terminated (MT) calls, comprising:
    determining a radio access technology (RAT) used for a latency-sensitive service (LSS) currently active on the UE in response to receiving an MT call invitation;
    determining whether a camped-on cell of the determined RAT is identified on an auto-reject list for MT call alerting;
    determining whether a latency-prone service command is received, wherein latency-prone service commands include service commands configured to change the determined RAT used for the LSS to another RAT likely to compromise the LSS, wherein determining whether the latency-prone service command is received is performed in response to determining that the camped-on cell of the determined RAT is not identified on the auto-reject list for MT call alerting;
    rejecting the MT call invitation in response to determining that the latency-prone service command is received; and
    allowing MT call alerting in response to determining that the latency-prone service command is not received.

2. The method of claim 1, further comprising receiving an LSS indication that the UE is using the LSS, wherein determining the RAT used for the LSS currently active is performed further in response to receiving the LSS indication.

3. The method of claim 2, wherein receiving the LSS indication comprises receiving the LSS indication via a user input on a user interface option configured to enable a user to select either allowing or rejecting MT call alerts during the LSS.

4. The method of claim 1, further comprising:
rejecting the MT call invitation in response to determining that the camped-on cell of the determined RAT is identified on the auto-reject list for MT call alerting.

5. The method of claim 1, further comprising:
allowing MT call alerting in response to determining that the RAT used for the LSS is not likely to compromise the LSS while allowing MT call alerting.

6. The method of claim 1, further comprising:
allowing MT call alerting in response to determining that the RAT used for the LSS is WiFi.

7. The method of claim 1, further comprising:
allowing MT call alerting in response to receiving a change-to-WiFi service command configured to change the determined RAT used for the LSS to WiFi.

8. The method of claim 1, further comprising:
ignoring the latency-prone service command in response to determining that the latency-prone service command is received.

9. The method of claim 1, wherein the latency-prone service command is an evolved packed system fall back (EPS FB) command associated with a 5G new radio (NR) RAT used for the LSS.

10. The method of claim 1, wherein the latency-prone service command is a single radio voice call continuity (SRVCC) command associated with a long-term evolution (LTE) RAT used for the LSS.

11. A user equipment (UE), comprising:
memory; and
a processor coupled to the memory and configured with processor-executable instructions to:
determine a radio access technology (RAT) used for a latency-sensitive service (LSS) currently active on the UE in response to receiving an MT call invitation;
determine whether a camped-on cell of the determined RAT is identified on an auto-reject list for MT call alerting;
determine whether a latency-prone service command is received, wherein latency-prone service commands include service commands configured to change the determined RAT used for the LSS to another RAT likely to compromise the LSS, wherein determining whether the latency-prone service command is received is performed in response to determining that the camped-on cell of the determined RAT is not identified on the auto-reject list for MT call alerting;
reject the MT call invitation in response to determining that the latency-prone service command is received; and
allow MT call alerting in response to determining that the latency-prone service command is not received.

12. The UE of claim 11, wherein the processor is further configured with processor-executable instructions to:
receive an LSS indication that the UE is using the LSS; and
determine the RAT used for the LSS currently active in response to receiving the LSS indication.

13. The UE of claim 12, wherein the processor is further configured with processor-executable instructions to receive the LSS indication by receiving the LSS indication via a user input on a user interface option configured to enable a user to select either allowing or rejecting MT call alerts during the LSS.

14. The UE of claim 11, wherein the processor is further configured with processor-executable instructions to:
reject the MT call invitation in response to determining that the camped-on cell of the determined RAT is identified on the auto-reject list for MT call alerting.

15. The UE of claim 11, wherein the processor is further configured with processor-executable instructions to allow MT call alerting in response to determining that the RAT used for the LSS is not likely to compromise the LSS while allowing MT call alerting.

16. The UE of claim 11, wherein the processor is further configured with processor-executable instructions to allow MT call alerting in response to determining that the RAT used for the LSS is WiFi.

17. The UE of claim 11, wherein the processor is further configured with processor-executable instructions allow MT call alerting in response to receiving a change-to-WiFi service command configured to change the determined RAT used for the LSS to WiFi.

18. The UE of claim 11, wherein the processor is further configured with processor-executable instructions to ignore the latency-prone service command in response to determining that the latency-prone service command is received.

19. The UE of claim 11, wherein the latency-prone service command is an evolved packed system fall back (EPS FB) command associated with a 5G new radio (NR) RAT used for the LSS.

20. The UE of claim 11, wherein the latency-prone service command is a single radio voice call continuity (SRVCC) command associated with a long-term evolution (LTE) RAT used for the LSS.

21. A non-transitory, processor-readable medium having stored thereon processor-executable instructions configured to cause a processor of user equipment (UE) to perform operations comprising:
determining a radio access technology (RAT) used for a latency-sensitive service (LSS) currently active on the UE in response to receiving an MT call invitation;
determining whether a camped-on cell of the determined RAT is identified on an auto-reject list for MT call alerting;
determining whether a latency-prone service command is received, wherein latency-prone service commands include service commands configured to change the determined RAT used for the LSS to another RAT likely to compromise the LSS, wherein determining whether the latency-prone service command is received is performed in response to determining that the camped-on cell of the determined RAT is not identified on the auto-reject list for MT call alerting;
rejecting the MT call invitation in response to determining that the latency-prone service command is received; and
allowing MT call alerting in response to determining that the latency-prone service command is not received.

22. The non-transitory, processor-readable medium of claim 21, wherein the stored processor-executable instructions are configured to cause a processor of the UE to perform operations further comprising receiving an LSS indication that the UE is using the LSS, wherein the stored processor-executable instructions are configured to cause a processor of the UE to perform operations such that determining the RAT used for the LSS currently active is performed further in response to receiving the LSS indication.

23. The non-transitory, processor-readable medium of claim 21, wherein the stored processor-executable instructions are configured to cause a processor of the UE to perform operations further comprising:
rejecting the MT call invitation in response to determining that the camped-on cell of the determined RAT is identified on the auto-reject list for MT call alerting.

24. The non-transitory, processor-readable medium of claim 21, wherein the stored processor-executable instructions are configured to cause a processor of the UE to perform operations further comprising:
allowing MT call alerting in response to determining that the RAT used for the LSS is WiFi.

25. The non-transitory, processor-readable medium of claim 21, wherein the stored processor-executable instructions are configured to cause a processor of the UE to perform operations further comprising:
allowing MT call alerting in response to receiving a change-to-WiFi service command configured to change the determined RAT used for the LSS to WiFi.

26. The non-transitory, processor-readable medium of claim 21, wherein the stored processor-executable instructions are configured to cause a processor of the UE to perform operations further comprising:
ignoring the latency-prone service command in response to determining that the latency-prone service command is received.

27. A user equipment (UE), comprising:
means for determining a radio access technology (RAT) used for a latency-sensitive service (LSS) currently active on the UE in response to receiving an MT call invitation;
means for determining whether a camped-on cell of the determined RAT is identified on an auto-reject list for MT call alerting;
means for determining whether a latency-prone service command is received, wherein latency-prone service commands include service commands configured to change the determined RAT used for the LSS to another RAT likely to compromise the LSS, wherein determining whether the latency-prone service command is received is performed in response to determining that the camped-on cell of the determined RAT is not identified on the auto-reject list for MT call alerting;
means for rejecting the MT call invitation in response to determining that the latency-prone service command is received; and
means for allowing MT call alerting in response to determining that the latency-prone service command is not received.

* * * * *